United States Patent
Ishikawa et al.

(10) Patent No.: US 9,445,358 B2
(45) Date of Patent: Sep. 13, 2016

(54) MOBILE COMMUNICATION TERMINAL, SERVER APPARATUS, CONTROLLING SYSTEM, CONTROLLING METHOD, AND PROGRAM

(71) Applicant: NTT DOCOMO, INC., Tokyo (JP)

(72) Inventors: Hironori Ishikawa, Tokyo (JP); Yuuki Asahi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/413,730

(22) PCT Filed: Jul. 10, 2013

(86) PCT No.: PCT/JP2013/068886
§ 371 (c)(1),
(2) Date: Jan. 9, 2015

(87) PCT Pub. No.: WO2014/010631
PCT Pub. Date: Jan. 16, 2014

(65) Prior Publication Data
US 2015/0141008 A1    May 21, 2015

(30) Foreign Application Priority Data
Jul. 13, 2012    (JP) .................................. 2012-157819

(51) Int. Cl.
*H04W 48/16*    (2009.01)
*H04W 48/18*    (2009.01)
(Continued)

(52) U.S. Cl.
CPC ............. *H04W 48/16* (2013.01); *H04W 48/18* (2013.01); *H04W 84/12* (2013.01); *H04W 88/06* (2013.01)

(58) Field of Classification Search
CPC ... H04W 48/16; H04W 48/18; H04W 84/12; H04W 88/06
See application file for complete search history.

(56) References Cited

U.S. PATENT DOCUMENTS

2008/0253343 A1* 10/2008 Sasao .................... H04W 48/18
370/338
2009/0052417 A1* 2/2009 Sakamoto ......... H04W 52/0229
370/338

(Continued)

FOREIGN PATENT DOCUMENTS

| JP | 2008182507 | 8/2008 |
| JP | 2010098363 | 4/2010 |
| JP | 2010171993 | 8/2010 |

OTHER PUBLICATIONS

Notice of Reasons for Refusal for Japanese Patent Application No. 2012-157819, dated May 12, 2015.

(Continued)

*Primary Examiner* — Kenneth Lam
(74) *Attorney, Agent, or Firm* — MKG, LLC

(57) ABSTRACT

A mobile communication terminal performs: registering a length of time starting at a time when an identifier of a base station is detected by a first communication unit, the identifier being transmitted by the base station accommodated in a first communication network, and ending at a time when the first communication unit accesses an access point accommodated in a second communication network in association with the identifier, the access point having an accessible range smaller than that of an accessible range of the base station; and starting, at the second first communication unit, a search for access information transmitted by the access point when a reference time determined based on a length of time associated with the registered identifier has passed a time when the identifier is detected, in a case where the identifier detected by the first communication unit is stored.

10 Claims, 18 Drawing Sheets

(51) Int. Cl.
 *H04W 84/12* (2009.01)
 *H04W 88/06* (2009.01)

(56) References Cited

U.S. PATENT DOCUMENTS

| | | | | |
|---|---|---|---|---|
| 2009/0067356 A1* | 3/2009 | Sakamoto | ......... | H04W 52/0229 370/311 |
| 2009/0111485 A1* | 4/2009 | Kitani | ................... | H04W 48/18 455/456.1 |
| 2010/0303040 A1* | 12/2010 | Takamune | ............ | H04W 48/16 370/331 |
| 2011/0009095 A1* | 1/2011 | Uemura | ................ | H04W 48/14 455/411 |
| 2012/0115540 A1* | 5/2012 | Kurose | ................ | H04B 1/3805 455/525 |
| 2013/0089032 A1* | 4/2013 | Jung | ..................... | H04W 48/16 370/328 |
| 2014/0066054 A1* | 3/2014 | Jung | ..................... | H04W 36/14 455/426.1 |

OTHER PUBLICATIONS

PCT International Search Report issued in International Application No. PCT/JP2013/068886, date mailed Oct. 1, 2013, pp. 1-2.

\* cited by examiner

| FIRST BASE STATION ID | SECOND BASE STATION ID | START TIME |
|---|---|---|
| ROPPONGI 1 | ROPPONGI 2 | 15:35 |
| AKASAKA 2 | ROPPONGI 1 | 15:22 |
| ... | ... | ... |

| AP ID | TYPE | AUTHENTICATION | 1st BASE STATION ID | 2nd BASE STATION ID | LENGTH OF TIME | CONNECTION TIME |
|---|---|---|---|---|---|---|
| Wi-FiA | IEEE802.11a/g | AAAAA/BBB | ROPPONGI 1 | ROPPONGI 2 | 10'0" | 2012.3.15 15:35 |
| Wi-FiA | IEEE802.11a/g | AAAAA/BBB | ROPPONGI 1 | ROPPONGI 2 | 9'32" | 2012.3.18 14:20 |
| Wi-FiB | IEEE802.11b/n | CCCCC/DDD | AKASAKA 3 | AKASAKA 1 | 15'21" | 2012.1.23 9:10 |
| ... | ... | ... | ... | ... | ... | ... |

| AP ID | ... | 1st BASE STATION ID | 2nd BASE STATION ID | LENGTH OF TIME | CONNECTION TIME | TIME SLOT |
|---|---|---|---|---|---|---|
| Wi-FiA | ... | ROPPONGI 1 | ROPPONGI 2 | 10'00" | 2012.3.15 15:35 | AFTERNOON |
| Wi-FiA | ... | ROPPONGI 1 | ROPPONGI 2 | 9'32" | 2012.3.18 14:20 | AFTERNOON |
| Wi-FiA | ... | ROPPONGI 1 | ROPPONGI 2 | 8'03" | 2012.4.10 9:20 | MORNING |
| Wi-FiA | ... | ROPPONGI 1 | ROPPONGI 2 | 7'48" | 2012.4.18 9:02 | MORNING |
| Wi-FiA | ... | ROPPONGI 1 | ROPPONGI 2 | 8'12" | 2012.4.26 10:45 | MORNING |

| AP ID | ... | 1st BASE STATION ID | 2nd BASE STATION ID | LENGTH OF TIME | ... | SIZE INFORMATION |
|---|---|---|---|---|---|---|
| Wi-FiA | ... | ROPPONGI 1 | ROPPONGI 2 | 10'13" | ... | LARAGE |
| Wi-FiA | ... | ROPPONGI 1 | ROPPONGI 2 | 8'19" | ... | SMALL |
| Wi-FiA | ... | ROPPONGI 1 | ROPPONGI 2 | 9'49" | ... | LARAGE |
| Wi-FiA | ... | ROPPONGI 1 | ROPPONGI 2 | 7'55" | ... | LARAGE |
| Wi-FiA | ... | ROPPONGI 1 | ROPPONGI 2 | 9'34" | ... | SMALL |

FIG. 19

MOBILE COMMUNICATION TERMINAL, SERVER APPARATUS, CONTROLLING SYSTEM, CONTROLLING METHOD, AND PROGRAM

TECHNICAL FIELD

The present invention relates to controlling a search for a correspondent node before starting a wireless communication.

BACKGROUND ART

Some mobile communication terminals including mobile phones and smart phones have a functionality of performing wireless communication via a wireless LAN or other protocol. Before performing wireless communication by use of such functionality, a mobile communication terminal must receive a signal transmitted by an access point and extract information from the signal. If there is no access point transmitting a signal detectable by the mobile communication terminal that is proximate to the mobile communication terminal, the terminal will search for an access point, necessitating consumption of power.

In JP2010-171993A, a wireless communication control unit: calculates, based on location information of the mobile terminal obtained by a GPS (GLOBAL POSITIONING SYSTEM) receiver and information indicative of an accessible range of an access point, a distance between a registered location of the access point and the mobile terminal; and increases a frequency of turning on power on the terminal to establish a communication channel with the access point; stated conversely, as a distance calculated shortens, a frequency of executing a search is reduced.

To apply the technology disclosed in JP2010-171993A to a mobile communication terminal, it would be necessary for the GPS unit to remain activated to calculate a distance between an access point and the terminal. As a result, power would be consumed to keep the GPS unit active, although an amount of power used in executing a search could be reduced.

SUMMARY

In view of the above, it is an object of the present invention to reduce the amount of power consumed for a search for an access point by a mobile communication terminal that is capable of performing wireless communication.

According to an aspect of the present invention, there is provided a mobile communication terminal, comprising: a first communication unit that performs wireless communication with a base station accommodated in a first communication network by receiving an identifier of the base station which identifier is transmitted intermittently by the base station; a second communication unit that performs wireless communication to access an access point accommodated in a second communication network by detecting information transmitted by the access point, the access point covering a range smaller than a range of the base station; a registration unit that calculates, when access to the access point is performed after a detection of the identifier, a length of time from the detection of the identifier to start of the access, and stores the calculated length of time in association with the detected identifier in a storage unit; and a control unit that causes the second communication unit to start searching for the access information when a reference time determined based on a length of time associated with the identifier has passed a time when the identifier is detected, in a case that the identifier detected by the first communication unit is stored.

Preferably, in a case that the mobile communication terminal accesses the access point after detection of first and second identifiers, the first identifier being detected before the second identifier, the registration unit calculates a length of time from a time when the second identifier is detected and registers the calculated length of time in association with the first and second identifiers; and if the second identifier associated with the first identifier is detected by the first communication unit after the registration of the first identifier, the control unit causes the second communication unit to start searching for access information when a reference time determined based on the length of time associated with the second identifier has passed from a time when the second identifier is detected.

Preferably, wherein if a detected identifier is stored in the storage unit, the control unit causes the second communication unit to terminate the search for the access information when a predetermined time after the reference time has passed.

Preferably, if the detected identifier is a predetermined identifier, the control unit does not cause the second communication unit to terminate the search.

Preferably, the registration unit stores the calculated length of time in addition to the identifier, in association with a time slot corresponding to a time when the identifier is detected; and if the detected identifier is stored in the registration unit, the control unit causes the second communication unit to start searching for the access information when a reference time is determined based on a length of time associated with the detected identifier and a time slot in which the searching started to have passed a time when the searching started.

Preferably, the registration units store size information indicative of a size of an accessible range for wireless communication performed by the base station; and if the identifier stored in the storage unit is detected, the control unit causes the second communication unit to start searching for the access information when a reference time determined based on a length of time associated with the identifier and the size information has passed from a time when the searching started.

According to another aspect of the present invention, there is provided a server comprising: an accumulating unit that, in a case where after a mobile communication terminal detects an identifier of a base station accommodated in a first communication network, the identifier being intermittently transmitted by the base station, the mobile communication terminal accesses an access point accommodated in a second communication network, the access point having an accessible range smaller than an accessible range of the base station, calculates a length of time starting at the detection of the identifier of the base station and ending at a completion of the access to the access point from the mobile communication terminal, a determination unit that determines that the identifier is detected in the mobile communication terminal; and a transmission unit that transmits an instruction of starting a search for access information of the access point to the mobile communication terminal when the length of time which is collected by the accumulating unit and associated with the identifier has passed from a time at which the identifier is detected.

According to another aspect of the present invention, there is provided a communication management system, comprising: a server apparatus and a plurality of mobile communication terminals, each mobile communication terminal comprises: a first communication unit that performs wireless communication with a base station accommodated in a first communication network by receiving an identifier of the base station which is transmitted intermittently by the base station; a second communication unit that performs wireless communication to access an access point accommodated in second communication network by detecting information transmitted by the access point, the access point covering a range smaller than the range of the base station; a registration unit that calculates, when an access to the access point is performed after a detection of the identifier, a length of time from the detection of the identifier to an initiation of the access, and stores the calculated length of time in association with the detected identifier in a storage unit; and a control unit that causes the second communication unit to start searching for the access information when a reference time determined based on a length of time associated with the identifier has passed from a time when the identifier is detected, in a case that the identifier detected by the first communication unit is stored, the server apparatus comprises: an accumulating unit that accumulates lengths of time from the mobile communication terminals; a determination unit that determines that the identifier is detected in a mobile communication terminal; a transmission unit that transmits an instruction for starting a search for access information of the access point to the mobile communication terminal when a length of time collected by the accumulating unit and associated with the identifier has passed a time when the identifier is detected.

According to another aspect of the present invention, there is provided a communication management method, comprising: registering a length of time starting at a time when an identifier of a base station is detected by a first communication unit, the identifier being transmitted by the base station accommodated in a first communication network, and ending at a time when the first communication unit accesses an access point accommodated in a second communication network in association with the identifier, the access point having an accessible range smaller than that of an accessible range of the base station; and starting a search for access information transmitted by the access point, by the first communication unit, when a reference time determined based on a length of time associated with the registered identifier has passed from a time when the identifier is detected, in a case that the identifier detected by the first communication unit is stored.

According to yet another aspect of the present invention, there is provided, a program that causes a computer configured to control a first communication unit and a second communication unit to execute: registering a length of time starting at a time when an identifier of a base station is detected by the first communication unit, the identifier transmitted by the base station being accommodated in a first communication network, and ending at a time when the first communication unit accesses an access point accommodated in the second communication network in association with the identifier, the access point having an accessible range smaller than that of an accessible range of the base station; and starting, at the second communication unit, a search for access information transmitted by the access point, when a reference time determined based on a length of time associated with the registered identifier has passed from a time when the identifier is detected, in a case where the identifier detected by the first communication unit is stored.

According to the present invention, power consumed in searching for an access point by a mobile communication terminal performing wireless communication will be reduced.

BRIEF DESCRIPTION OF THE DRAWINGS

FIG. 19 shows a set of data written in a table stored in second DB.

FIG. 26 shows an example of data set written in a table stored in relation to registration of a length of time.

DETAILED DESCRIPTION

First Embodiment

A connection management system according to a first embodiment of the present invention will now be described.

Overview

Figure 1:
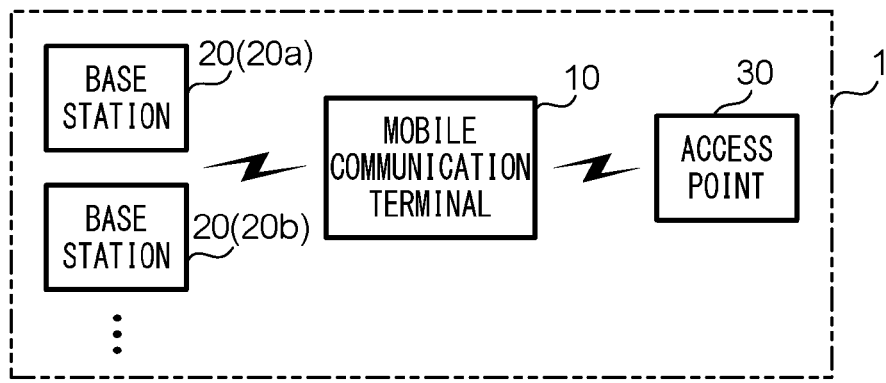
FIG. 1 shows an overview of a configuration of a connection management system.

FIG. 1 shows an overall configuration of a connection management system 1. In connection management system 1, different types of communication, that is, mobile communication and wireless LAN communication, are performed. Mobile communication means wireless communication performed with a base station accommodated in a first communication network (for example, a cellular network), which is run by a provider of a communication service. Wireless LAN communication means wireless communication performed with an access point accommodated in a second communication network (for example, LAN), which is different from the first communication network. Specifically, wireless LAN communication is performed by IEEE 802.11N/A/G/B or other protocol for wireless communication. Connection management system 1 includes two or more base stations 20 and access points (APs) 30, and mobile communication terminals 10.

Mobile communication terminal 1 may be a mobile phone, a smart phone, or another terminal, which can be carried by a user of the terminal. It is possible for the user to select various routes to an intended destination. Functionalities of performing mobile communication with base stations 20 and wireless LAN communication with AP 30 are implemented in mobile communication terminal 10. Each of base stations 20 performs communication with mobile communication terminal 10 situated within a range ("a cell" of the base station) such that it can receive a signal representative of information including audio, image, text and the like, which is transmitted by the base station 20; and in turn a signal transmitted by mobile communication terminal 10 located within the range can be received by the base station. Stated otherwise, the cell has a range in which a base station 20 is capable of performing wireless communication with mobile communication terminal 10 situated in the range. This supposes that cells of base stations 20*a* and 20*b* shown in FIG. 1 are located next to each other.

AP 30 is an apparatus that performs authentication or another process for accessing a correspondent node to communicate with the correspondent node via wireless LAN. AP 30 transmits a signal containing information (hereinafter referred to as "access information") necessary for accessing the correspondent node. Upon receipt of the signal, mobile communication terminal 10 extracts access information from the signal and accesses AP 30 using the access information. A range in which a signal transmitted by AP 30 can be received by mobile communication terminal 10 means, in turn, that mobile communication terminal 10 can access AP 30 in that range. In this regard, the range will be referred to hereinafter as "an accessible range." It is noted that the accessible range is smaller than a cell of base station 20. Hereinafter, transmission of a signal containing the access information can simply be referred to as transmission of information, for the sake of convenience. Similarly, the extraction of information from a received signal may simply be otherwise referred to as "detection" of information. In this regard, AP 30 transmits the access information and mobile communication terminal 10 "detects" the access information transmitted by AP 30.

When the functionality of wireless LAN communication is activated, mobile communication terminal 10 repeatedly starts a search for access information until access is successfully established. Mobile communication terminal 10 may continue supplying power for the functionality of wireless LAN communication to repeat the search process while the user of mobile communication terminal 10 is moving, such that access information of AP 30 can be detected immediately after a user enters an accessible range of AP 30 to access AP 30 quickly.

The amount of data per a predetermined time that can be handled by AP 30 is generally large compared to that handled by a base station 20, although the amount varies depending on an amount of traffic. In this regard, performing mobile communication outside the accessible range of AP 30, where mobile communication terminal 10 cannot perform a wireless LAN communication with AP 30 and performing wireless LAN communication with AP 30 in the accessible range will enable the terminal to handle more data as compared to a case where only mobile communication is performed. In terms of smooth communication, it is preferable to keep the functionality of wireless LAN communication activated during movement of mobile communication terminal 10. In this case, power consumed during conducting of the search continues to increase during the movement. As a result, the battery power of mobile communication terminal 10 depletes rapidly. In view of this, connection management system 1 is configured to manage the search so as to reduce power consumption. Details of the configuration and operation of the system will be described below:

Configuration

Figure 2:
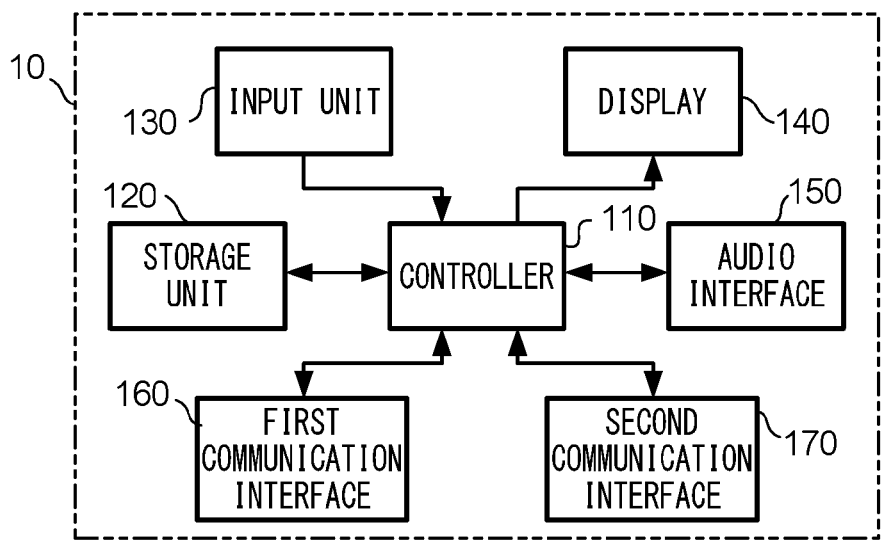
FIG. 2 shows a hardware configuration of a mobile communication terminal.

FIG. 2 shows a hardware configuration of mobile communication terminal 10. Mobile communication terminal 10 is a computer that includes a control unit 110, storage unit 120, input unit 130, display 140, audio interface 150, first communication interface 160, and second communication interface 170. Control unit 110 includes a CPU (CENTRAL PROCESSING UNIT), ROM (READ ONLY MEMORY), RAM (RANDOM ACCESS MEMORY), and a real-time clock. The CPU is configured to control each of the units of mobile communication terminal 10 described above by executing a program(s) stored in the ROM and/or storage unit 120 using the RAM as a work area. The real-time clock displays the current date and time.

Storage unit 120 is a flash memory, hard drive or other storage device, in which data and program(s) used by control unit 110 for controlling mobile communication terminal 10 are stored. Additionally, predetermined parameters including threshold values used in mobile communication terminal 10 are stored in storage unit 120. Input unit 130 includes keys and/or a touch sensor, and other input devices for outputting a signal indicative of an operation input by a user to control unit 110. Control unit 110 performs a processing corresponding to the signal. Display 140 includes a screen that displays an image based on data stored in storage unit 120 based on an instruction supplied from control unit 110 on the screen. Audio interface 150 includes a speaker, microphone, and audio signal processor, which is configured to handle an audio signal relating to voice communication.

First communication interface 160 includes an antenna that transmits and receives a signal, and a mobile communication circuit, so as to perform mobile communication with base station 20. First communication interface 160 inputs and outputs data to and from control unit 110, which transmits and receives to and from base station 20 via first communication interface 160. Second communication interface 170 includes an antenna that transmits and receives a signal, and a circuit for performing a mobile communication, so as to perform a wireless LAN communication with AP 30. Second communication interface 170 inputs and outputs data to and from control unit 110, which transmits and receives to and from AP 30 via second communication interface 170.

Figure 3:
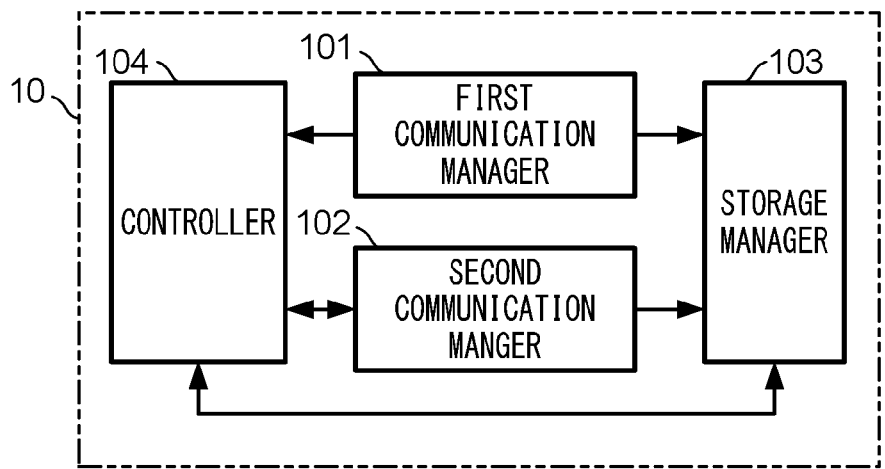
FIG. 3 shows a functionality implemented by the mobile communication terminal.

According to the hardware configuration described above, mobile communication terminal 10 controls the search. A program for controlling the search is stored in storage unit 120. Control unit 110 executes the program to control each mobile communication terminal 10 shown in FIG. 2, so as to implement a functionality explained below. FIG. 3 shows a functionality implemented by mobile communication terminal 10. Mobile communication terminal 10 includes a first communication manager 101, second communication manager 102, storage manager 103, and controller 104.

First communication unit 101 is configured to perform mobile communication with base station 20, which is implemented by control unit 110 and first communication interface 160 shown in FIG. 2, which cooperate with each other. Base station 20 intermittently transmits a signal including a base station ID by a predetermined length of time (1 second, for example) so as to perform mobile communication with a mobile terminal including a mobile communication unit 10. The base station ID is information for identifying a base station 20 and a cell. In this embodiment, a base station ID includes the name of a region covered by a cell. For example, base station IDs of base stations 20a and 20b shown in FIG. 1 are "Roppongi 1" and "Roppongi 2," respectively, and are named after the name of the area in which they are located. Upon receipt of the signal, first communication manager 101 extracts a base station ID from the signal, and performs mobile communication with base station 20, which transmits the base station ID. Also, first communication manager 101 measures the strength of the received signal (hereinafter referred to as "signal strength") from which the base station ID is extracted. Upon extraction of the base station ID, first communication manager 101 outputs the base station ID and the signal strength to storage manager 103 and controller 104.

Second communication manager 102 is configured to perform wireless LAN communication with AP 30, which is implemented by control unit 110 and second communication interface 170, which are shown in FIG. 2, in cooperation with each other, so as to perform wireless LAN communication. AP 30 intermittently transmits the access information by a predetermined length of time (for example, 0.1 second). Specifically, the access information includes information identifying AP 30, a frequency assigned for the wireless LAN communication, data rate, encryption type, and condition(s) with regard to wireless LAN communication performed by a protocol adopted by AP 30. Second communication manager 102 repeatedly checks at a predetermined interval (for example, 1.0 second) whether a signal including the access information is received. Upon receipt of the signal, second communication manager 102 extracts the access information from the received signal. Second communication manager 102 iterates the extraction at a predetermined interval (for example, 5 seconds).

In second communication manager 102, a power supply to second communication interface 170 is maintained under control of control unit 110 while the search is performed. Second communication manager 102 can operate under a first mode or a second mode. In the first mode, second communication unit 102 is caused to perform the repeated search at a predetermined interval. In the second mode, second communication manager 102 is caused to stop the search. In second communication manager 102, consumption of power occurs at a predetermined interval in the first mode, whereas no power is consumed in the second mode. A user can change the modes by inputting an instruction via input unit 130. When a condition specified by the extracted access information is acceptable, second communication manager 102 accesses an access point (for example, AP 30) transmitting the extracted access information after an authentication process. After accessing AP 30, second communication manager 102 outputs information with regard to the access, which may include the name of a wireless LAN protocol, to storage manager 130.

Figures 4, 5, 6:
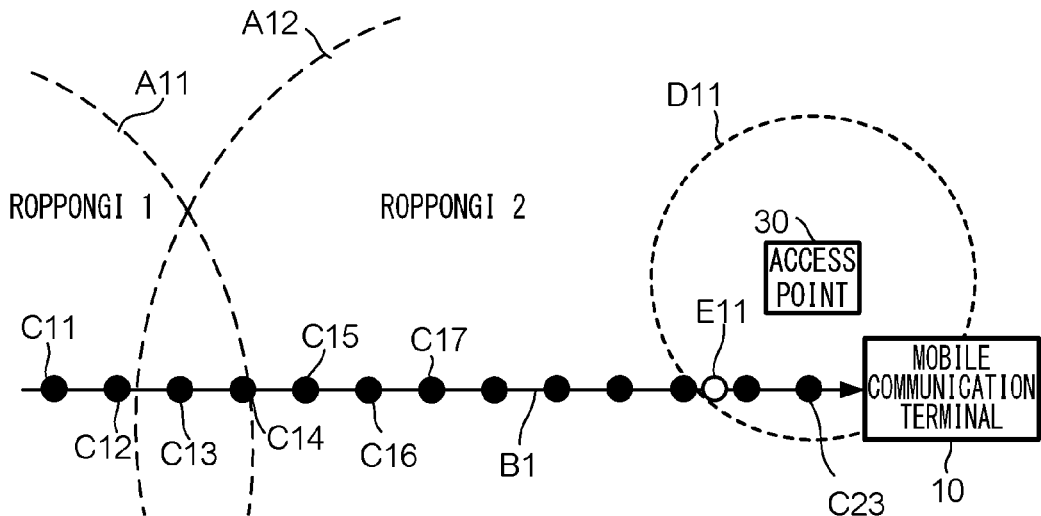
FIG. 4 shows a geographical information to explain a length of time.
FIG. 5 shows an example of data written in a table stored in a first database (DB).
FIG. 6 shows an example of data written in a table stored in a second DB.

Storage 103 stores a length of time in association with a base station ID, which is implemented by control unit 110 and storage unit 120 shown in FIG. 2 that cooperate with each other. The length of time means a duration measured by storage manager 103 based on base station ID and signal strength, which are supplied from first communication manager 101 and information with regard to an access, which is supplied from second communication manager 102 during a movement of mobile communication terminal 10. Referring to FIG. 4, the length of time will now be described in detail.

FIG. 4 shows geographic information explaining the length of time. In FIG. 4, a cell A11 of base station 20a shown in FIG. 1 that covers the area "Roppongi 1" and cell A12 of base station 20b converging on to the area "Roppongi 2" is shown. Mobile communication terminal 10 moving from cell A11 to cell A12 by crossing the borders of the cells is also shown in FIG. 4. It is assumed here that a mobile communication terminal 10 moves from a first cell to a neighboring second cell. Hereinafter, a base station ID (in this case, "Roppongi 1") transmitted by a base station covering the first cell is referred to as "a first base station ID," and a base station ID (in this case, "Roppongi 2") transmitted by a base station covering the second cell is referred to as "a second base station ID." When mobile communication terminal 10 is moved along a path B1 indicated by an arrow, the first base station ID ("Roppongi 1") is detected at positions indicated by C11, C12, C13, C14, C15 and C16, respectively during the movement. The second base station ID ("Roppongi 2") is detected at positions indicated by C13 through C23.

Information detected by first communication manager 101 during the movement changes such that only the first base station ID is detected before C12 is reached, the first and the second base station IDs are detected from C13 though C16, and only the second base station ID is detected at C17 or after. Hereinafter, a time instant at which second base station ID is detected by first communication unit 101 is referred to as "a start time." The start time is an example of a timing of starting an access in the present invention. Storage manager 103 confirms a start time based on the base station ID and the signal strength, which are supplied from first communication manager 101, and stores the confirmed start time in association with the first and second base station IDs. Specifically, the start time and the first and second base station IDs are stored in the first database (DB).

FIG. 5 is a table showing an example of data stored in the first DB. The table has fields for "first base station ID," "second base station ID," and "start time." The first line shows that mobile communication terminal 10 changed cells from A11 specified by first base station ID "Roppongi 1" to A12 specified by second base station ID "Roppongi 2" at 15:35. The second line shows that mobile communication terminal 10 changed cells from "Akasaka 2," "Roppongi 1" at 15:22. A set of a start time and first and second base station IDs is added to the first DB each time mobile communication terminal 10 changes cells.

In FIG. 4, accessible range D11 of AP 30 located in cell A12 is shown. Second communication manager 102 of mobile communication terminal 10 receives access information transmitted by AP 30 when reaching D11 after the change of cells. At a position E11 shown in FIG. 4, mobile communication terminal 10 initiates accessing AP30 using the access information. Hereinafter, the time at which the access starts is referred to as a "connection time". Storage manager 103 confirms that a time at which information with regard to an access is obtained is the connection time. Storage manager 103 stores the information used for the confirmation and the connection time correspondingly in the second database (DB).

FIG. 6 is a table showing an example of data stored in the second DB. The table has fields for "AP identifier," "type," "authentication," and "connection time." Storage manager 103 stores the data in the fields. After second communication manager 102 accesses AP 30 after the change of cells, storage manager 103 confirms the connection time and adds the first and second base station IDs, which are stored in the first DB and are associated with the start time recorded most recently, to the second DB. In this example, "Roppongi 1" and "Roppongi 2" are registered as the first base station ID and the second base station ID, respectively.

Additionally, when second communication manager 102 accesses AP 30, storage manager 103 calculates a length of time (10 minutes and 0 second, in this example), which starts at a time (i.e., a start time) at which first communication manager 101 detects the second base station ID and ends with the connection time at which access to AP30 starts, and stores the calculated time in the second DB. By this process, the length of time and first and second base station IDs (in this case, "Roppongi 1" and "Roppongi 2") are stored in association with each other by storage manager 103. Storage manager 103 outputs the stored first and second base station IDs and the length of time to controller 104 in response to a request.

Controller 104 causes second communication manager 102 to start the search for access information, which is implemented by control unit 110 and second communication interface 170 shown in FIG. 2, in cooperation with each other. Specifically, controller 104 sets the first mode in which the search is repeatedly performed at a predetermined interval to start the search for the access information. Hereinafter, a process to cause second communication manager 102 to start the search for the access information, which is performed by controller 104, is referred to as "a search initiation process." When information detected by first communication manager 101 changes from the first base station ID to the second base station ID, controller 104 checks whether the information indicative of an occurrence of the change is stored by storage manager 103.

If the information indicative of an occurrence of the change is stored, it means that there was a change in the information detected by first communication manager 101 from the first base station ID stored by storage manager 103 to the second base station ID stored by storage manager 103 correspondingly to the first base station ID. In a case where the change described above occurs, controller 104 starts the search initiation process upon detection of the search made by first communication manager 101. More specifically, the search initiation process starts at a time when an interval corresponding to a length of time stored in association with the second base station ID by storage manager 103 has passed following the detection. Hereinafter, a period of time corresponding to the length of time is referred to as "a wait time." The wait time is merely an example of a first reference time determined based on a length of time in the present invention.

Operation

According to the configuration described above, connection management system 1 executes a search process. Specifically, the search process includes a registration process and a search initiation process. In the registration process, a length of time is calculated and stored, and this is performed each time mobile communication terminal 10 accesses AP 30. The search initiation process is a process for initiating a search that is performed when there is a change of cell, which change already has been registered. Operations performed by mobile communication terminal 10, base stations 20, and AP 30 with regard to the registration process will now be described.

Figure 7:
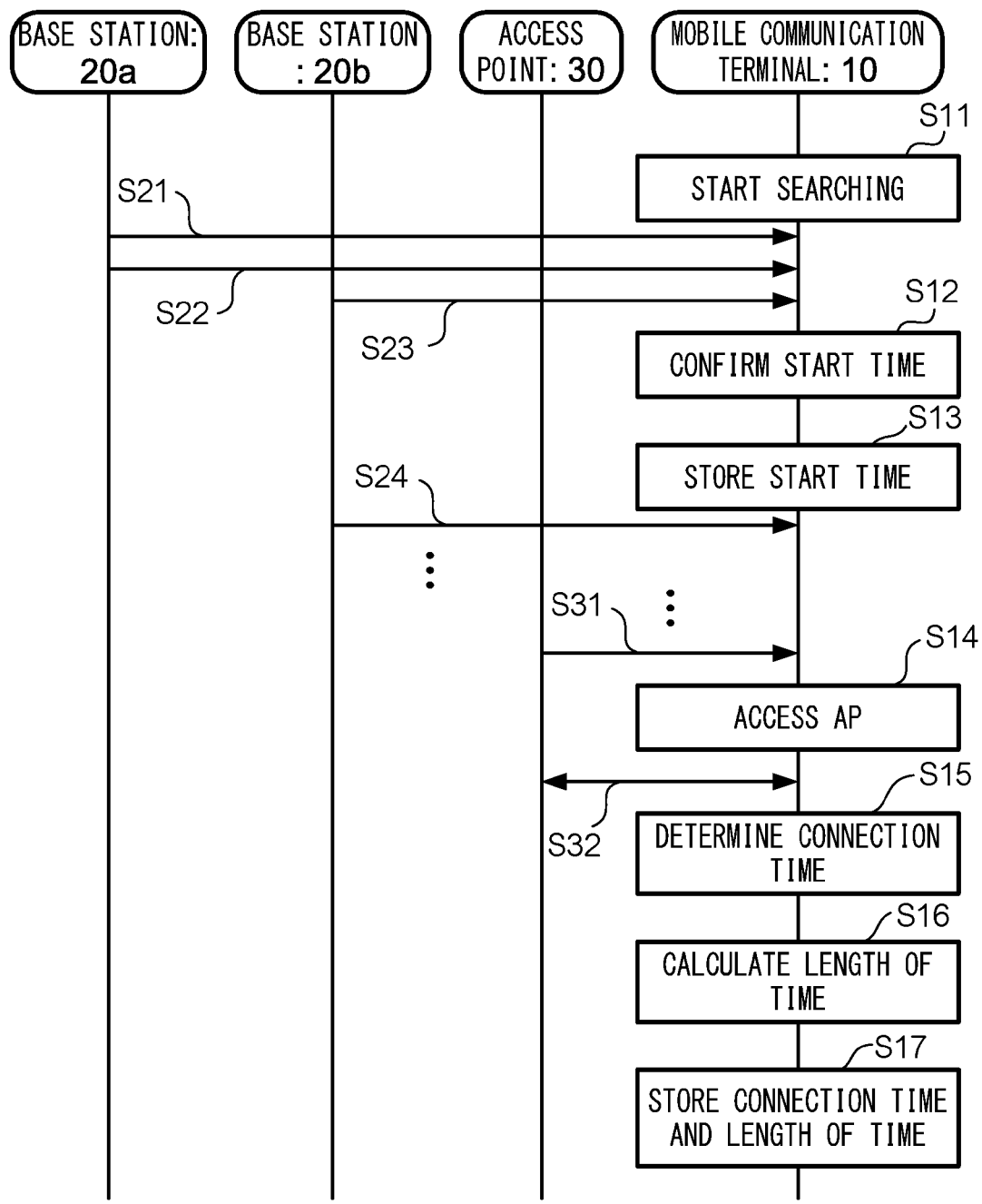
FIG. 7 is a sequence chart showing an example of a process of registration of a length of time.

FIG. 7 is a sequence chart showing exemplified operations performed by mobile communication terminal 10, base stations 20, and AP 30 with regard to the registration process. In this example, it is assumed that a user of mobile communication terminal 10 moves along path B1 shown in FIG. 4. In the registration process, prior to reaching the range in which the signal transmitted from AP 30 can be received, it is necessary to set second communication manager 102 shown in FIG. 3 to the first mode. In this example, a user inputs an instruction for setting the first mode at a position before reaching C12 shown in FIG. 4 to start the search (step S11). The process of step S11 is performed by second communication manager 102. The process of step S11 can be performed at a timing other than prior to receipt of a signal including access information performed at step S31, which will be described later.

In a case that a user moves together with mobile communication terminal 10, mobile communication terminal 10 receives a signal transmitted by base station 20a (steps S21 and S22). When mobile communication terminal 10 moves from C12 to C13, mobile communication terminal 10 receives the signal transmitted by base station 20b (step S23). The processes from steps S21 to S23 are performed by first communication manager 101. Upon receipt of the signal at step S23, mobile communication terminal 10 confirms a start time (step S12), and stores the start time in association with the first base station ID and the second base station ID shown in FIG. 5 (step S13). The processes of steps S21 through S23 with regard to receipt of the signal and the processes of S12 and S13 are performed by storage manager 103.

Continuing to move after step S13, mobile communication terminal 10 continues to receive the signal transmitted by base station 20b (step S24). Receipt of the signal is repeated after step S24, although description thereof is omitted in FIG. 7. AP 30 transmits the access information repeatedly (step S31). Transmission is repeatedly performed prior to step S31, although description thereof is omitted in FIG. 7. Upon receipt of the signal in step S31, mobile communication terminal 10 initiates accessing AP 30 (step S14). Upon completion of access to AP30, mobile communication terminal 10 performs a wireless LAN communication responsive to an instruction input by the user (step S32). The processes of step S31 (receipt of the signal) and the processes of S32 and S14 are performed by second communication manager 102.

After access to AP30 starts, mobile communication terminal 10 confirms a connection time (step S15) and calculates a length of time using the connection time and start time stored in step S13 (step S16). Next, mobile communication terminal 10 stores the connection time and the length of time in association with the information shown in FIG. 6 (step S17). The processes of steps S15, S16, and S17 are performed by storage manager 103. The processes from steps S11 to S17 performed by mobile communication terminal 10 are included in the registration process of calculating and storing the length of time.

Figure 8:
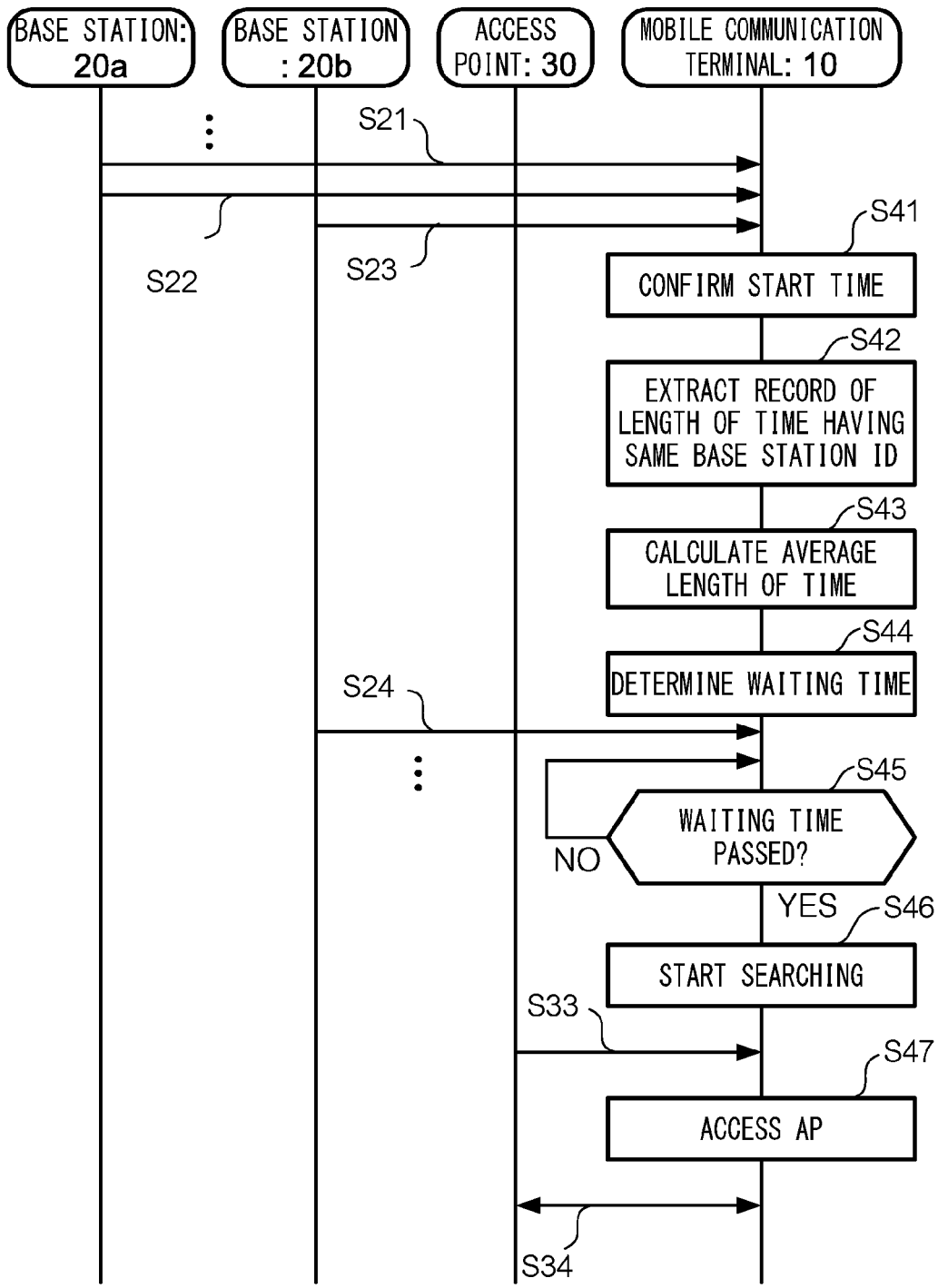
FIG. 8 is a sequence chart showing an example of a process of starting a search.

The search initiation process performed using the length of time stored in the registration process will now be described. FIG. 8 is a sequence chart showing an example of operation performed by the nodes in relation to the search initiation process. FIG. 8 shows an operation of the nodes when the user moves along path B1 shown in FIG. 4 together with mobile communication terminal 10. It is assumed here that the user experienced the same changing of the cells and that a record of the change is stored. In FIG. 8, a process with regard to receipt of the signal transmitted by base stations 20*a* and 20*b* by mobile communication terminal 10 is similar to that shown in FIG. 7. Thus, like processes are referred to using like numerals.

Upon receipt of the signal included in a base station ID in step S23, mobile communication terminal 10 confirms a time of receipt of the signal as the start time (step S41). The process of step S41 is performed by storage manager 103 shown in FIG. 3. Next, mobile communication terminal 10 extracts a record of the start time registered by the registration process, which is registered in association with the base station IDs (i.e., first base station ID and second base station ID), the same as the record of the outstanding change (step S42). In this example, it is assumed that mobile communication terminal 10 moves from "Roppongi 1" to "Roppongi 2" and therefore a start time "15:35" is specified.

Next, mobile communication terminal 10 extracts records of the start time calculated based on the start time specified in step S42 and calculates an average of the extracted lengths of time (hereinafter referred to as "an average length of time") (step S43). In this example, as shown in the table in FIG. 6, two records associated with a change from "Roppongi 1" and "Roppongi 2" are found; thus, the records "10 minutes and 0 second" and "9 minutes and 32 seconds" are extracted. Accordingly, "9 minutes and 46 seconds" is calculated as the average length of time. Next, mobile communication terminal 10 determines a waiting time based on the calculated average length of time (step S44). The waiting time indicates a length of time that begins with the start time and ends with a time when the search is initiated by mobile communication terminal 10. Mobile communication terminal 10 determines a time (8 minutes and 46 seconds) by extracting a predetermined length of time (1 minute and 0 second) from the average length of time (9 minutes and 46 seconds) as the waiting time.

After the process of step S44, mobile communication terminal 10 continues checking whether the waiting time (8 minutes 46 seconds) has passed from the start time during the movement, (In this example, 8 minutes 46 seconds) (step S45). If it is determined that the waiting time has not passed (step S45:NO), mobile communication terminal 10 repeats the process of step S45. If it is determined that the waiting time has passed (step S45:YES), mobile communication terminal 10 starts the search (step S46). By this process, when a mobile communication terminal 10 moves from "Roppongi 1" to "Roppongi 2" the search starts after the waiting time (8 minutes 46 seconds) has passed from the start time at which "Roppongi 2" is detected. The processes of steps S42 through S46 are performed by controller 104 shown in FIG. 3.

After the process of step S46, mobile communication terminal 10 continues to move together with the user. When mobile communication terminal 10 reaches an area where the signal transmitted by AP 30 can be received, mobile communication terminal 10 receives the signal (step S33). Next, mobile communication terminal 10 accesses AP 30 (step S47) and performs a wireless LAN communication with AP 30 (step S34) responsive to an instruction input by the user. The processes of steps S33 (receipt of the signal), S34 and S47 are performed by second communication manager 102. Once the processes of steps S41 through S47 have been performed, mobile communication terminal 10 starts the search initiation process when the waiting time has passed if there is a change of cells whose record is stored.

In view of the foregoing, once mobile communication terminal 10 undergoes a change of cells and access to AP30, the search automatically starts to access AP 30 without the user needing to input an instruction thereafter. It is noted that the search does not start until mobile communication terminal 10 reaches an accessible range. Thus, an amount of power consumed will be reduced compared to a case where the search is continuously performed during the movement.

Also, mobile communication terminal 10 determines a time at which the search starts based on the start time at which mobile communication terminal 10 changed cells. An area in which the change can occur is limited to an area (hereinafter referred to as "an overlapping area") in which cells A11 and A12 overlap, as shown in FIG. 4. Accordingly, a path for which the length of time is calculated necessarily passes through the overlapping area.

Figure 9:
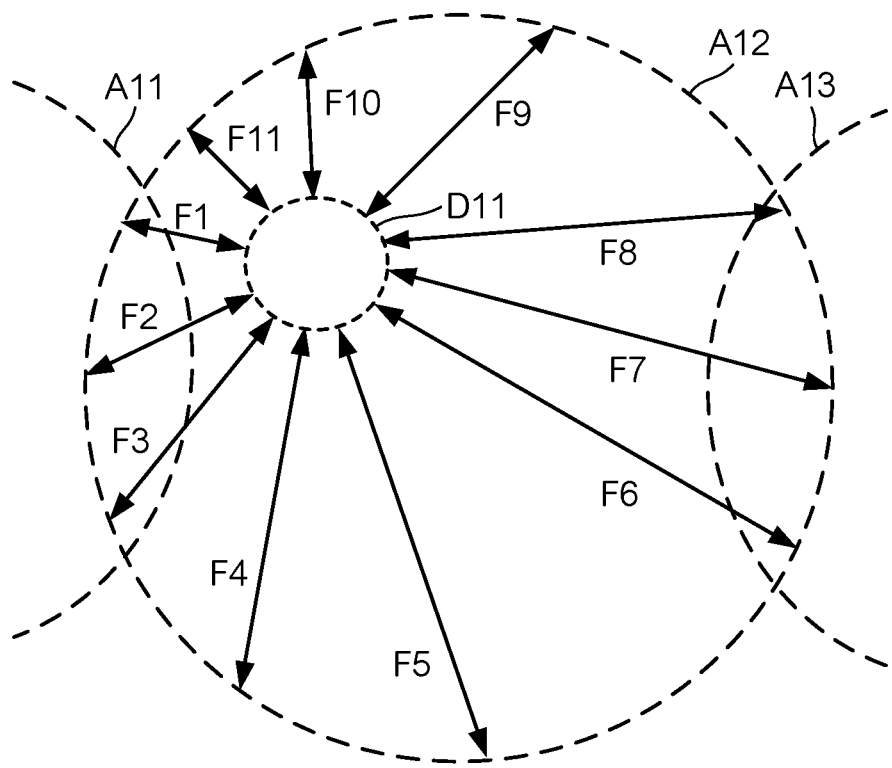
FIG. 9 shows an example of paths to an accessible range from outside of a cell.

FIG. 9 shows an example of routes from the perimeter of cell A12 to reach accessible range D11. In FIG. 9, eleven routes F1 through F11 are described as strength lines for the sake of explanation. Routes F1, F2, and F3 extend to cell A12 through an overlapping area of cells A11 and routes F6, F7, and F8 extend to cell A12 through an overlapping area of cells A12 and A13. Other routes extend to cell A12 without passing through these overlapping areas. As shown in FIG. 9, in a case where accessible range D11 is not located in a center of cell A12, the length of a route is shorter for a route (F11, for example) entering from a direction near the location of accessible range D11 than a route (F6, for example) entering from the opposite direction.

It is unlikely that a situation will occur where an overlapping area accommodates the shortest possible route (F11) and the longest route (F6) at the same time, since routes passing through an overlapping area are concentrated in a particular direction as viewed from accessible range D11. To summarize, lengths of time for routes passing through a same overlapping area tend to be close to each other in time. Thus, mobile communication terminal 10 starts the search based on a length of time calculated from the same change of cells. As a result, the start time of the search will be set such that it is close to a time when mobile communication terminal 10 reaches an accessible range.

Generally, a mobile communication terminal has a functionality of intermittently exchanging signals with a base station to register a location of the terminal. Mobile communication terminal 10 detects, using the functionality, a base station ID transmitted by base station 20, and executes the search initiation process using the base station ID. Thus, it is not necessary to activate a GPS unit or other sensors to obtain location information in performing of the search initiation process by mobile communication terminal 10. Accordingly, power consumption with regard to a search for correspondent node will be reduced compared to a case where the search initiation process is performed based on the general functionality.

Mobile communication terminal 10 executes the registration process and the search initiation at the same time. Specifically, upon completion of access to AP 30 in step S47 shown in FIG. 8, mobile communication terminal 10 confirms the connection time and the length of time from the start time obtained in step S41. By this process, when the registration process is executed, a length of time is newly registered. Registered lengths of time may include various values for the same path. One of the reasons for this is that the user temporarily stops at a location along the path. In this case the length of time will be larger. If the user is running, the length of time will be shorter. If the waiting time is determined based directly on a length of time having a much larger or shorter value than average, problems will occur. For example, if the search starts after the user reaches the accessible range, a time period for establishing wireless LAN communication becomes short. Conversely, if the search starts too early, power consumption will increase. In view of this, mobile communication terminal 10 calculates the average length of time taken to absorb a deviation of a user's irregular behavior when the same change of cells and accompanying accesses are performed two or more times.

Second Embodiment

Connection management system 1 according to the second embodiment of the present invention has a hardware configuration the same as that of the first embodiment, but is different in its operation in that a termination of the search is performed in addition to the initiation of the search. Controller 104 of mobile communication terminal 10 according to this embodiment executes the search initiation process and the search termination process. In the search termination process, second communication manager 102 is caused to terminate the search for access information. Specifically, controller 104 sets second communication manager 102 to the second mode (in which second communication manager 102 is prohibited to perform the search), to effect the search termination process. Also, controller 104 starts the search termination process after a time determined based on the length of time that has passed, similarly to the search initiation process. The time determined based on the length of time is longer than the waiting time, and is hereinafter referred to as "a termination time." The termination time is an example of a second reference time according to the present invention. In connection management system 1 of this embodiment, instead of the search initiation process, a search initiation/termination process is performed in which an initiation and termination of the search are performed. The search initiation/termination process is included in processes of controlling the search performed by mobile communication terminal 10.

Figure 10:
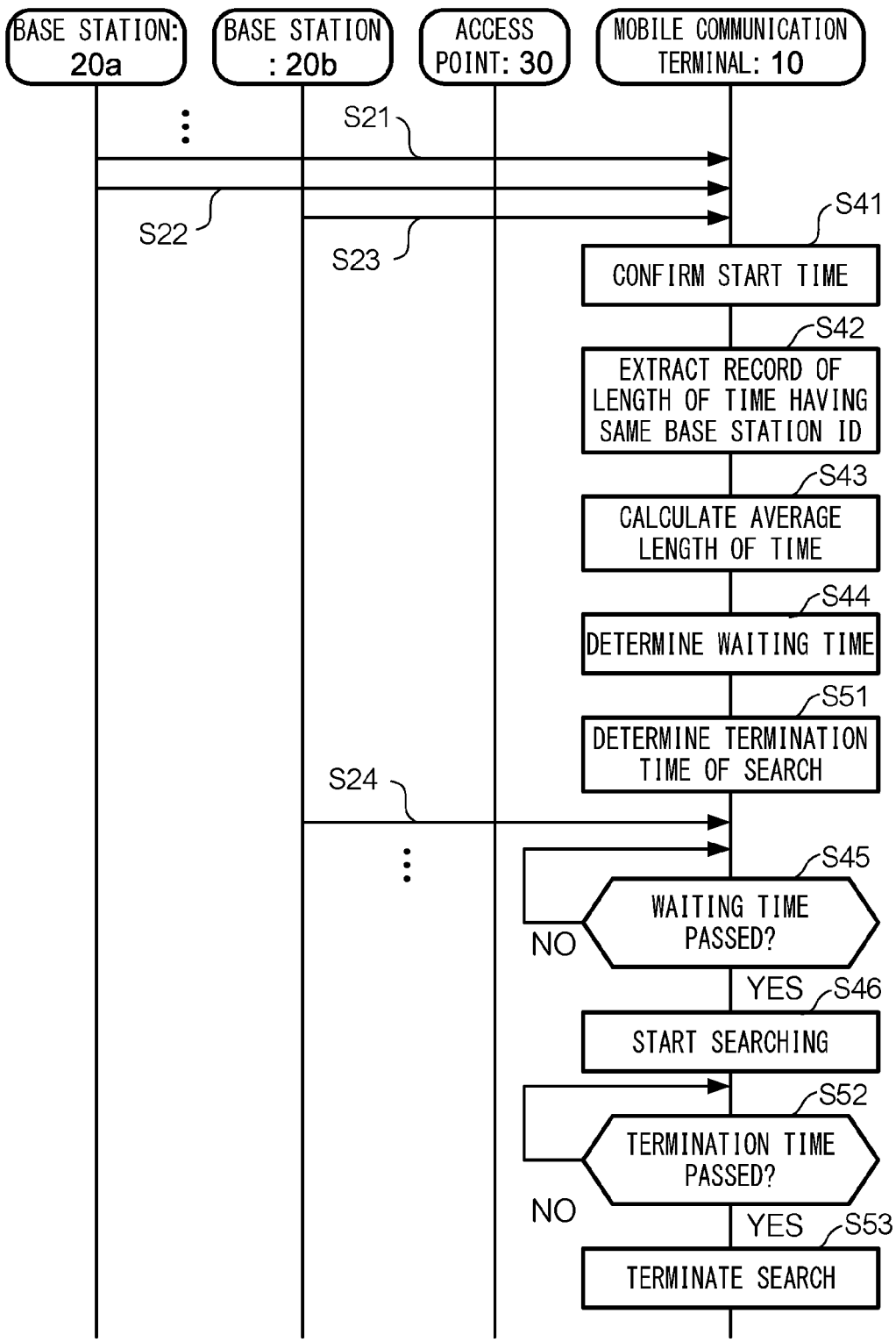
FIG. 10 is a sequence chart showing an example of a process of initiation and termination of a search.

FIG. 10 is a sequence chart showing an example of operations performed at the nodes with regard to the search initiation/termination process. In the search initiation/termination process, the determination of the waiting time at step S44 and the processes performed previously are similar to the search initiation process shown in FIG. 8. In the example shown in FIG. 10, it is assumed that, similarly to the example shown in FIG. 8, mobile communication terminal 10 moves from "Roppongi 1" to "Roppongi 2." Mobile communication terminal 10 determines a termination time based on the average length of time calculated in step S43 (step S51). Specifically, mobile communication terminal 10 determines the termination time (14 minutes and 46 seconds) by adding a predetermined time length (in this embodiment, 5 minutes 0 second) a time added to the average length of time (in this example, 9 minutes and 46 seconds).

After completion of steps S45 and S46 shown in FIG. 8, mobile communication terminal 10 checks whether the termination time (in this example, 14 minutes and 46 seconds) has passed from the start time (step S52). If the termination time has not passed (step S52, NO), mobile communication terminal 10 repeats the process of step S52. When the termination time has not passed (step S52:YES), mobile communication terminal 10 terminates the search (step S53). By doing so, when moving from "Roppongi 1" to "Roppongi 2," mobile communication terminal 10 starts the search when the waiting time (8 minutes and 46 seconds) from the start time at which detection of "Roppongi 2" is detected has come, and terminates the search when the termination time (14 minutes and 46 seconds) has come. Steps S51, S52, and S53 are performed by controller 104.

It is noted that the user does not necessarily trace the same path for some reasons. For example, if a user usually moves along a path entering a cell through an accessible range, the user may stop moving toward an accessible range of AP 30 and go back along the path. Or the user may go around the accessible range in the cell. When mobile communication terminal 10 accessing AP 30 subsequent to the initiation of the search goes out of the accessible range, the search termination process is executed by termination of the wireless LAN communication and the search. If the search initiation and termination processes are not introduced, the search process continues in mobile communication terminal 10, thus power is consumed despite AP30 not having been accessed. In this regard, mobile communication terminal 10 of this embodiment executes the search initiation/termination processes, so as to terminate the search when a predetermined time (in this example, 6 minutes and 0 second) has passed from the initiation of the search, regardless of whether there is access to AP 30. As a result, consumed power will be reduced compared to the case where the mechanism of terminating the search is not provided.

Third Embodiment

A configuration of connection management system 1 according to the third embodiment of the present invention is similar to that of the first and second embodiments. However, this embodiment is different from the first and second embodiments in that the search termination process is not necessarily executed. Specifically, the search termination process is not executed for a change of cells relating to a particular cell. More specifically, controller 104 of this embodiment does not execute the search termination process in the case where a base station ID detected by first communication manager 101 is registered.

Figure 11:
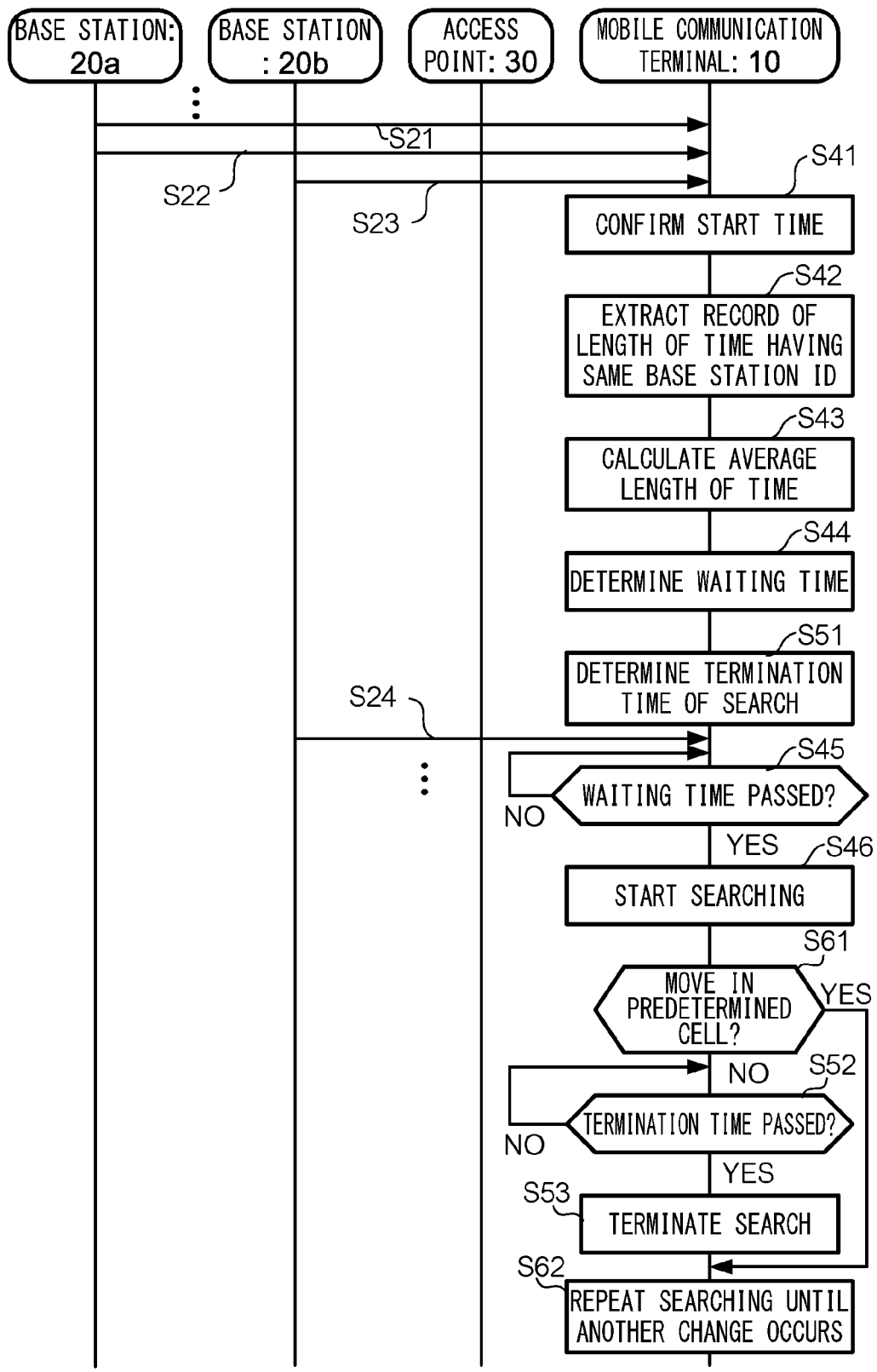
FIG. 11 is also a sequence chart showing an exemplified process of the initiation and termination of the search.

FIG. 11 is a sequence chart showing an example of operations performed by the nodes with regard to the search initiation/termination process according to this embodiment. In this example, the initiation of the search performed in step S46 and the processes performed before are similar to that of search initiation/termination process shown in FIG. 10. After the process of step S46, mobile communication terminal 10 checks whether the base station ID included in the signal received in step S23 is registered, to determine whether the cell into which the mobile communication terminal 10 has entered is registered (step S61). If the cell is not registered (step S61:NO), mobile communication terminal 10 proceeds to steps S52 and S53. If the cell is registered (step S61:YES), mobile communication terminal 10 continues the search until the next change of cells occurs without performing steps S52 and S53 (step S62). The processes of steps S61 and S62 are performed by controller 104. Mobile communication terminal 10 may skip the process of step S51 in a case where a process similar to step S61 has been performed.

Accordingly, when mobile communication terminal 10 of this embodiment has come into a particular cell, the search continues until it moves to another cell. For example, mobile communication terminal 10 accesses AP 30 that is located at an office at which the user works and is located in the particular cell even when the user goes in and out of the accessible range of AP 30 many times. If the user leaves the office, it is necessary for the user to change second communication manager 102 from the second mode in which the search is prohibited to the first mode in which the search is repeatedly performed at a predetermined interval. In this embodiment, it is not necessary for the user to change a mode of mobile communication terminal 10 to access AP 30 by registering a cell accommodating an AP 30 accessed by mobile communication terminal 10 intermittently.

Fourth Embodiment

In the embodiments described above, it is assumed that the size of a cell does not change. In the fourth embodiment, it is possible for each base station 20 to change the size of a cell. For example, provided that it is known that the number of mobile communication terminals situated in a cell is larger than that in the neighboring cells in a certain time slot, there is a case where the size of cells may be changed by decreasing the size of the cell with a larger number of terminals and increasing the neighboring cells to get the terminals situated in the cells closer to each other. Specifically, each base station 20 controls a strength of transmission of a signal to change the size of a cell. Connection management system 1 according to the fourth embodiment has a similar configuration to that of the embodiments described above, despite the search initiation process depending on a time slot. Hereinafter, the search initiation process according to this embodiment is described. Detailed description for the search initiation/termination process according to this embodiment is omitted since the search termination process included in the search initiation/termination process is performed similarly to the search initiation process.

Storage manager 103 according to this embodiment stores the length of time calculated above in association with a time slot including the start time with regard to the calculation of the length of time, that means the time slot includes a time when a search for a second base station ID is initiated by first communication unit 101, in addition to the second base station ID. Controller 104 starts the search initiation process when a waiting time is determined based on the length of time associated by storage manager 103 with a time slot that includes a time when a search for the second base station ID is initiated has passed from a time when the search for the second base station ID is initiated by first communication manager 101.

Figures 12, 13:
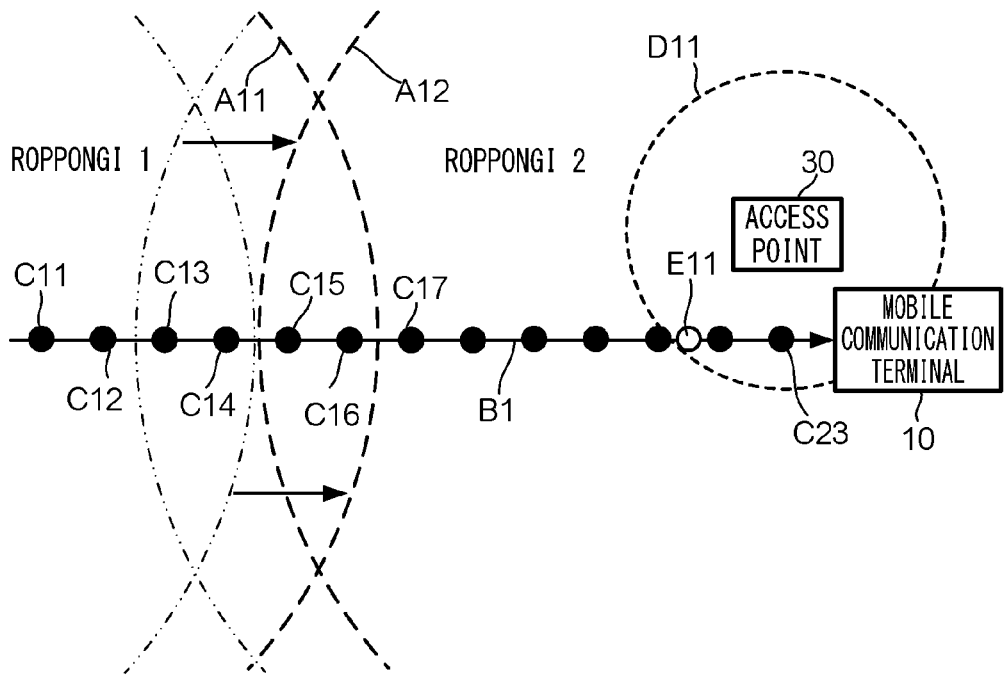
FIG. 12 shows a change of a size of a cell.
FIG. 13 shows an example of data written in a table stored in the second DB.

FIG. 12 shows an example of the change of sizes of cells shown in FIG. 4. As shown in FIG. 12, cell A11 is expanded so that first base station ID ("Roppongi 1") can be detected at C16, as it can only be detected at C14 before the expansion. On the other hand, cell A12 has decreased so that the second base station ID ("Roppongi 2") can be detected at C15 or after as it can be detected at C13 before the decrease. After the change of sizes, a length of time from the start time to the connection time, which means a period of time starting when second base station ID is detected at C15 to a time when mobile communication terminal 10 starts accessing AP 30 at E11, becomes shorter. For example, cells A11 and A12 are of sizes shown in FIG. 12 in the morning while in the afternoon the cells are of sizes shown in FIG. 4.

FIG. 13 is an example of data written in a table stored in second DB according to this embodiment. The first and second lines of the table are similar to those shown in FIG. 6. In the first and second lines, the lengths of time are written, the lengths of time being calculated for a case where mobile communication terminal 10 moves from "Roppongi 1" to "Roppongi 2" with the sizes of cells A11 and A12 shown in FIG. 4. In the third to the fifth lines, the lengths of time ("8 minutes and 3 seconds," "7 minutes and 48 seconds," and "8 minutes and 15 seconds") are written, the lengths of time being calculated for a case where mobile communication terminal 10 moves from "Roppongi 1" to "Roppongi 2" with the sizes of cells A11 and A12 shown in FIG. 12.

A data item "time slot" is stored in the second DB according to this embodiment in addition to data items shown in FIG. 6. A time slot is associated with a length of time in the second DB, and indicates a time slot that includes a start time by which the length of time is calculated. According to this embodiment, the time slot with either data value "Morning" or "Afternoon" can be written in the field of the time slot. In this example, lengths of time of the first and the second lines are associated with "Afternoon," whereas the lengths of time in the third to the fifth lines are associated with "Morning." Also, an average of the lengths of time associated with "Afternoon" is 9 minutes and 46 seconds and an average of the lengths of time associated with "Morning" is 8 minutes and 1 second.

Figure 14:
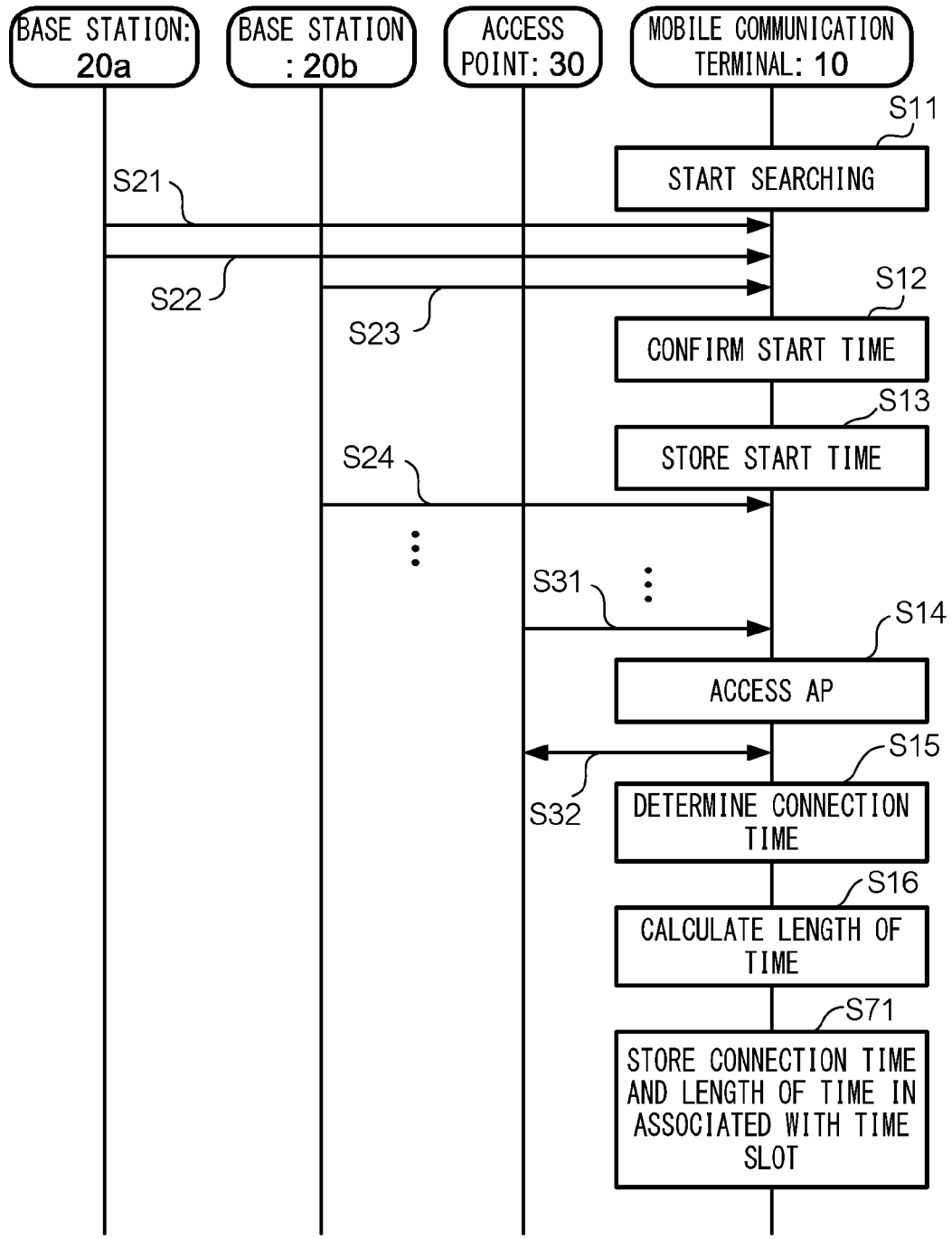
FIG. 14 is a sequence chart showing another example of the process of the registration of a length of time.

FIG. 14 is a sequence chart showing an example of operations performed by the nodes with regard to a registration process according to this embodiment. In this example, the process of step S16 for calculating a length of time and the process performed previously are similar to those of the registration process shown in FIG. 7. After performing the process of step 16, mobile communication terminal 10 stores the connection time confirmed in step S15 and the length of time calculated in step S16, in association with a time slot ("Morning" or "Afternoon") including the start time obtained in step S12 (step S71). After the registration processes are repeatedly performed, data shown in FIG. 13 is stored.

Figure 15:
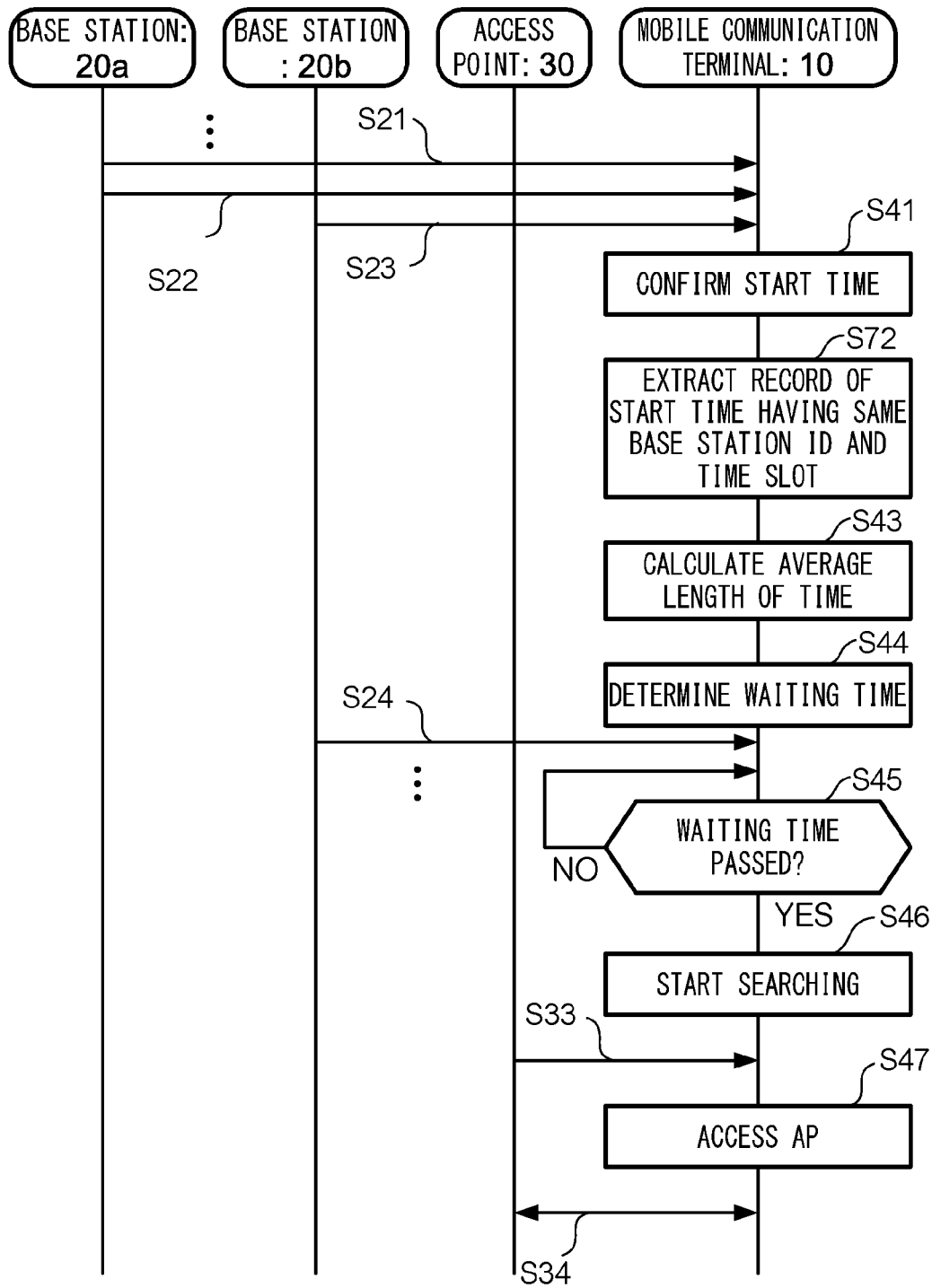
FIG. 15 is a sequence chart showing another example of the process of starting the search.

FIG. 15 is a sequence chart showing an example of operations performed by the nodes with regard to a search initiation process according to this embodiment. In this example, the process of step S41 for confirming the start time and the process performed previously are similar to those of the search initiation process shown in FIG. 8. After performing step S41, mobile communication terminal 10 extracts, from records of the start time obtained in the registration process shown in FIG. 14 previously performed, a record of the start time associated with the base station IDs (first base station ID and second base station ID) and the time slot (Morning or Afternoon) which are the same as those of the currently obtained record (step S72). The process of step S72 is performed by controller 104. Next, mobile communication terminal 10 performs the processes of step S43 onwards, which are the same as those of searching the initiation process shown in FIG. 8.

If the start time obtained in step S41 includes the morning time slot, mobile communication terminal 10 according to this embodiment calculates 8 minutes and 1 second for the average length of time. In a case where the start time obtained in step S41 includes the afternoon time slot, 9 minutes and 46 seconds is calculated for the average length of time. If the process of step S43 was performed regardless of a time slot, a calculated average length of time would be 8 minutes and 43 seconds, which would be larger than the average (8 minutes and 1 second) of the lengths of time obtained for a case where a change of cells occurs in the morning. As a result, it is likely that the search is initiated when a user communication terminal 10 has already come within accessible range D11 and therefore a shorter time period for performing a wireless LAN communication is given to the user, as compared to this embodiment. In a case where the change of cells occurs in the afternoon, a calculated average of the lengths of time would be 8 minutes and 1 second, which is shorter than the average 9 minutes and 46 seconds calculated in this embodiment. As a result, a time period during which the search is performed would be longer and therefore consumption of power would be larger as compared to this embodiment. Stated otherwise, according to this embodiment it is possible to avoid a shorter time period being given for performing a wireless LAN communication and consumed power being reduced, as compared to a case where the average length of time is calculated regardless of a time slot.

Fifth Embodiment

Figure 16:
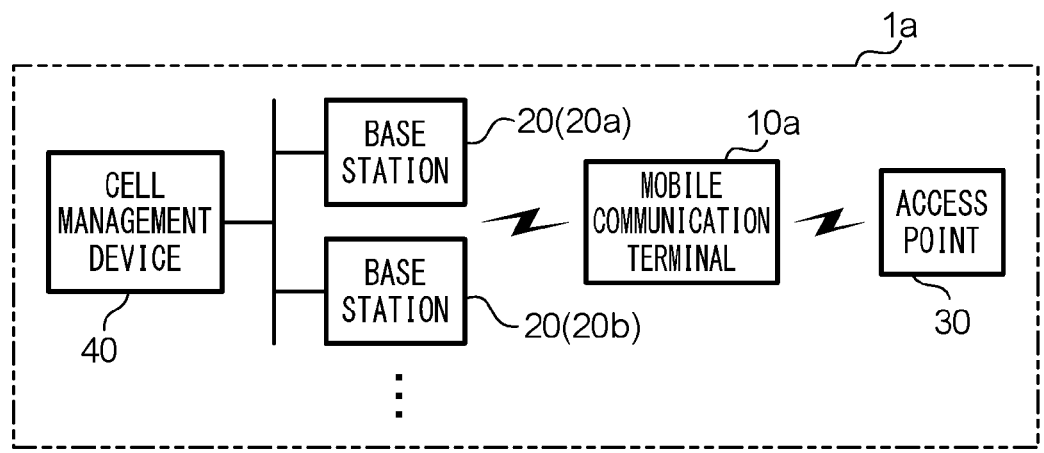
FIG. 16 shows another configuration of a connection management system.

In the fourth embodiment, a size of a cell changes depending on the time slot. In the fifth embodiment, the size of cell is changed by an administrator of a base station, manually or automatically. FIG. 16 shows a configuration of a connection management system 1a according to this embodiment. Hereinafter, description will be confined mainly to the difference from the configuration shown in FIG. 1. Connection management system 1a includes a mobile communication terminal 10a and cell management device 40. Cell management device 40 is managed by the administrator described above and connected to base stations 20. Cell management device 40 transmits to each of base stations 20 data indicative of a strength of a single one including a base station ID of the base stations 20, responsive to an instruction input by the administrator. Upon receipt of the data from cell management device 40 each base station 20 transmits a signal with a strength according to the data. It is noted that cell management device 40 is an example of an external device according to the present invention.

In view of the above, cell management device 40 instructs the size of a cell to each and each base station 20 changes the size of the cell responsive to the instruction by means of the strength of the signal. Each base station 20 transmits a base station ID that includes data indicative of the size of a cell (hereinafter "size information"). Specifically, the data indicates "Large" or "Small" in this embodiment. For example, in a case where the size of cell A11 of base station 20a is as shown in FIG. 4, a base station ID including "Roppongi 1" and "Small" is transmitted. In a case where the size of cell A11 is as shown in FIG. 12, a base station ID including "Roppongi 1" and "Large" is transmitted. Similarly, in a case where a size of cell A13 of base station 20b is as shown in FIG. 4, a base station ID including "Roppongi 3" and "Large" is transmitted. In a case where the size of cell A12 is as shown in FIG. 12, a base station ID including "Roppongi 2" and "Small" is transmitted.

Figure 17:
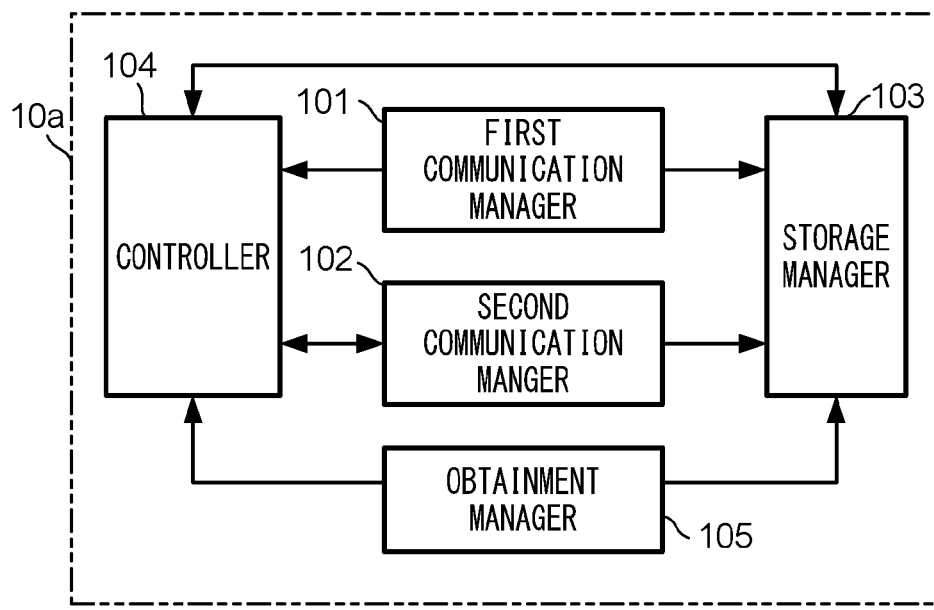
FIG. 17 shows a functionality implemented by a mobile communication terminal.

Mobile communication terminal 10a has a hardware configuration shown in FIG. 2 in which storage unit 120 stores a program for performing the search process, which is different from a program stored in mobile communication terminal 10. Control unit 110 executes the program to control each unit to implement the functionality provided below in mobile communication terminal 10a. FIG. 17 shows the functionality implemented in mobile communication terminal 10a. Hereinafter, descriptions will be mainly directed to a difference from a configuration shown in FIG. 3. Mobile communication terminal 10a further includes an obtainment manager 105 in addition to the units shown in FIG. 3. Obtainment manager 105 is configured to obtain size information of each base station 20, which is implemented by control unit 110 and first communication interface 160 co-operating with each other. Upon receipt of a signal from base station 20, obtainment manager 105 extracts the size information indicating either "Large" or "Small" from the signal. Obtainment manager 105 outputs the size information to storage manager 103 and controller 104.

Storage manager 103 adds the length of time, which is shown in FIG. 7 and calculated in step S16, to the base station ID, and stores the base station ID in association with the size information that is obtained by obtainment manager 105 at the start time, used in the calculation of length of time, when the search for the base station ID was initiated by first communication manager 101. Controller 104 starts the search initiation process after a waiting time determined based on the length of time that is stored in storage manager 103 in association with both the base station ID and the size information which are obtained by obtainment manager 105 when the waiting time has passed from the time when the search for the base station ID was initiated by first communication manager 101.

Figure 18:
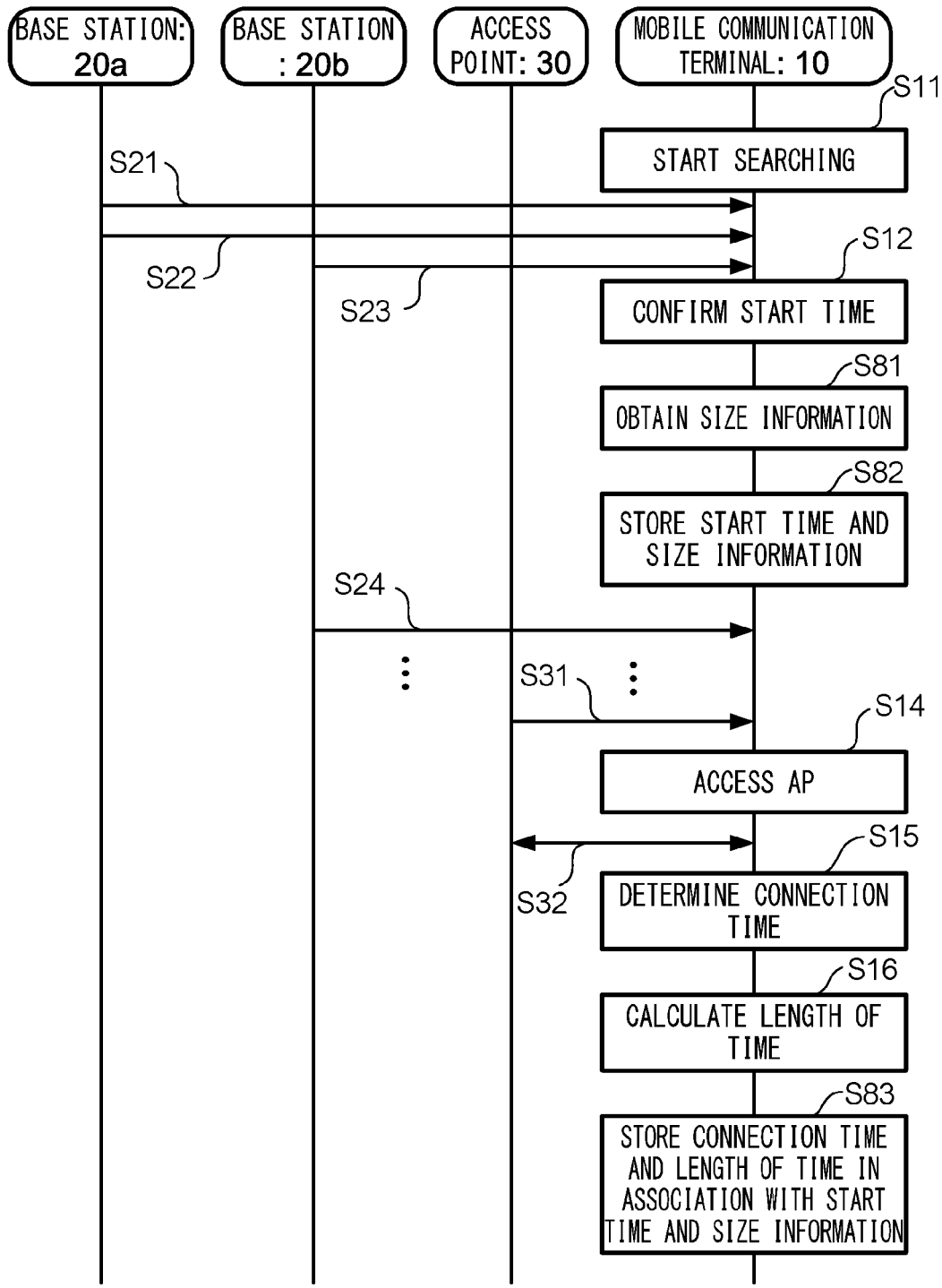
FIG. 18 is a sequence chart showing another example of the process of registration of a length of time.

FIG. 18 is a sequence chart showing an example of operations performed by the nodes with regard to the registration process according to this embodiment. In this example, the process of step S12 for confirming the start time and the processes performed before are the same as those of the registration process. After completion of step S12, mobile communication terminal 10 obtains the size information included in the signal received in step S23 (step S81). Next, mobile communication terminal 10 stores the start time and the size information correspondingly (step S82). Next, the processes from steps S24 to S16, which are the same as that of the registration process shown in FIG. 7, are performed. After that, mobile communication terminal 10 associates the connection time confirmed in step S15 and the length of time calculated in step S16 with the start time obtained in step S12 and the size information obtained in step S81 (step S83). The data items associated with each other in step S83 are stored in the second DB. The process of step S81 is performed by obtainment manager 105. The processes of step S82 and S83 are performed by storage manager 103.

FIG. 19 shows an example of data written in a table stored in second DB according to this embodiment. In the table, five records of lengths of time ("10 minutes 13 and seconds," "8 minutes 19 and seconds," "9 minutes and 49 seconds," "7 minutes and 55 seconds," and "9 minutes and 34 and seconds"), which were calculated when mobile communication terminal 10 moved from "Roppongi 1" to "Roppongi 2" are stored. Also, each of the five records of the lengths of time is associated with the size information indicative of the size of a cell to which mobile communication terminal 10 moved, which are "Large," "Small," "Large," "Small," and "Large," associated, respectively. In this example, an average length of time is 9 minutes and 52 seconds for a case where size information is "Large" and 8 minutes and 7 seconds for a case where size information is "Small."

Figure 20:
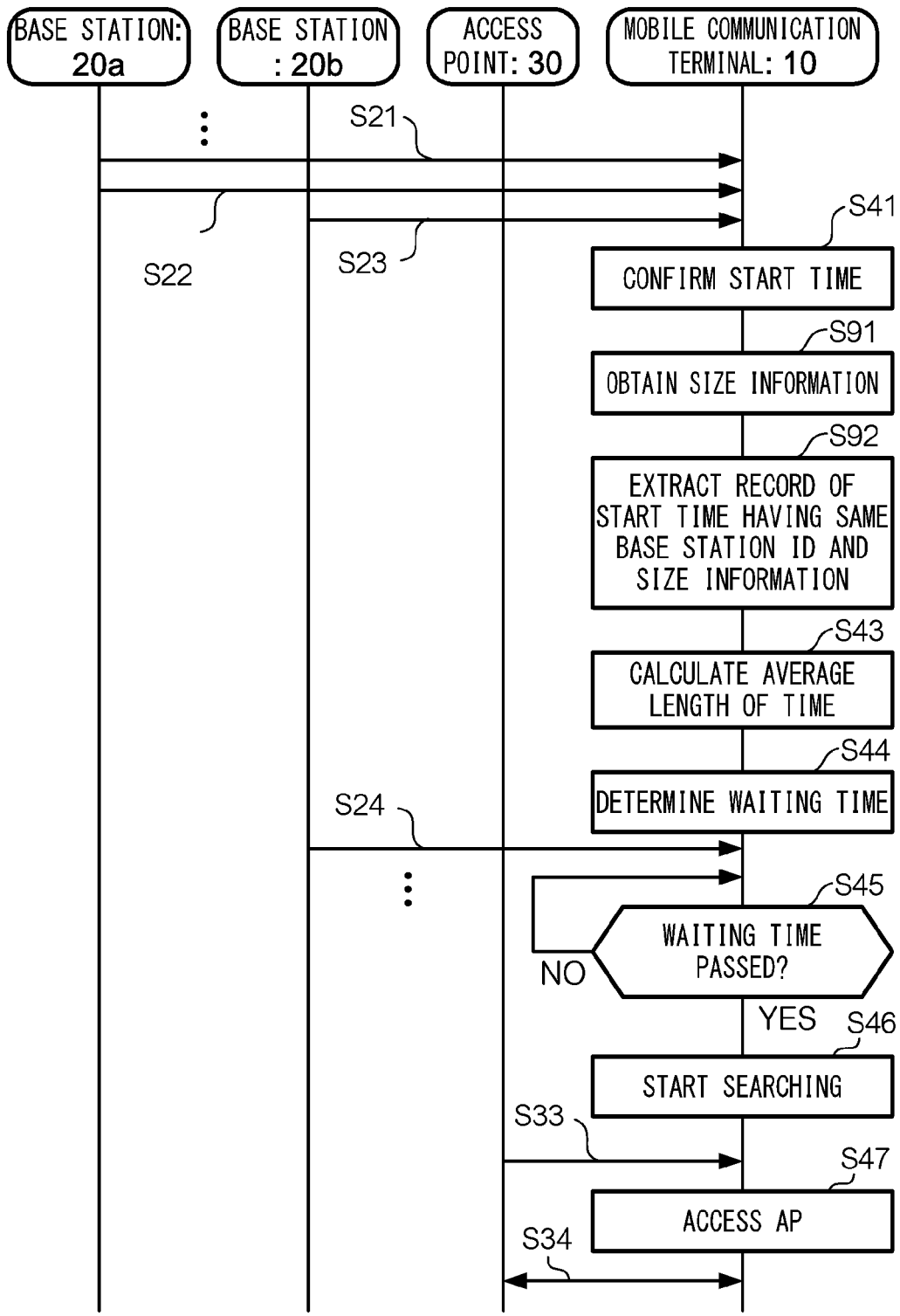
FIG. 20 is a sequence chart showing an example of a process of management of initiation of the search.

FIG. 20 is a sequence chart showing an example of operations performed by the nodes with regard to the search initiation process according to this embodiment. In this example, the process at step S41 for obtaining the start time and the processes performed previously are the same as those of the search initiation process shown in FIG. 8. After completion of the process at step S41, mobile communication terminal 10 extracts size information from the signal received in step S23 (step S91). Next, mobile communication terminal 10 extracts a record of the start time stored in relation to the registration process shown in FIG. 14, the record having the same base station IDs (first base station ID and second base station ID) and a size information (Large or Small) which is the same as that obtained in step S91 (step S92). The processes of step S91 and S92 are performed by controller 104. After the process at step S43, mobile communication terminal 10 performs the same processes as those of search initiation process shown in FIG. 8.

According to this embodiment, if the size information at the start time obtained in step S41 indicates "Large," mobile communication terminal 10 calculates 9 minutes 52 seconds for the average length of time. If the size information indicates "Small" it calculates 8 minutes 7 seconds for the average length of time. If the processes of step S43 were performed without using the size information, 9 minutes 10 seconds would be calculated as the average length of time, which is larger than the average 8 minutes 7 seconds for a case where a movement across the cells occurs when a size of cell A12 is "Small." As a result, it is likely that the search is initiated when user communication terminal 10 has already come within accessible range D11 and therefore a shorter time period for performing a wireless LAN communication is given to the user, as compared to this embodiment. On the other hand, the average length of time 9 minutes 10 seconds is smaller than 9 minutes and 52 seconds calculated in this embodiment. As a result, a time period during which the search is performed would be longer and therefore consumption of power would be larger as compared to this embodiment. Stated otherwise, according to this embodiment it is possible to avoid a shorter time period being given for performing a wireless LAN communication and consumed power being reduced, as compared to a case where the average length of time is calculated without using the size information.

Sixth Embodiment

Figure 21:
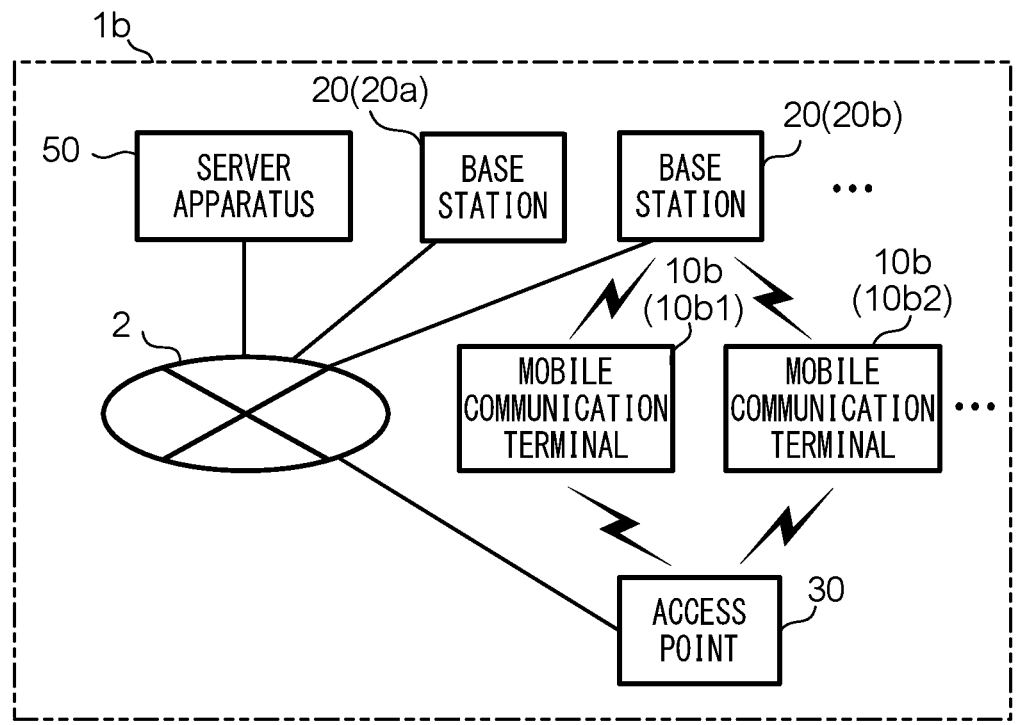
FIG. 21 shows a configuration of a connection management system.

In the embodiments described above, the systems include a single mobile communication terminal for which an access control is performed. A connection management system according to the sixth embodiment of the present invention includes two or more mobile communication terminals and is different from the embodiments described above in that a length of time calculated by mobile communication terminal is used for another mobile communication terminal. FIG. 21 shows a configuration of a connection management system 1b according to this embodiment. Hereinafter, description will be directed mainly to a difference from the configuration shown in FIG. 1. Connection management system 1b includes network 2, two or more mobile communication terminals 10b, and a server apparatus 50. Network 2 includes a mobile communication network and the internet. Base stations 20, AP 30, and server apparatus 50 are connected via network 2.

Mobile communication terminals 10b include mobile communication terminals 10b1 and 10b2. Mobile communication terminals 10b perform a mobile communication with a base station 20 or a wireless LAN communication with AP 30 so as to transmit and receive data to and from server apparatus 50 via network 2. Each mobile communication terminal 10b executes the registration process shown in FIG. 7, and transmits the detection-related information that includes the access information, the length of time and base station IDs (before and after a change of size of cells), which are registered in connection with the registration process, to server apparatus 50. When each mobile communication terminal 10b obtains the start time in step S41 shown in FIG. 8, start timing data including the start time and the first and second base station IDs are transmitted to server apparatus 50. Alternatively, each mobile communication terminal 10 may execute the registration process shown in FIGS. 14 and 15 instead of the registration process shown in FIG. 7.

Figure 22:
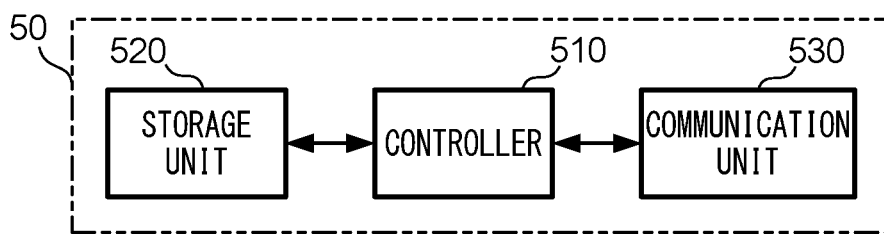
FIG. 22 shows a hardware configuration of a server apparatus.

Server apparatus 50 stores the data included in the detection-related information transmitted by mobile communication terminals 10b. Also, server apparatus 50 determines a waiting time based on a length of time registered in connection with a change of cells made by any one of mobile communication terminals 10b that experienced a change of cells and thus transmitted the start time. Also, server apparatus 50 instructs the mobile communication terminal 10b to start the search initiation process when the waiting time has passed from the start time. FIG. 22 shows a hardware configuration of server apparatus 50. Server apparatus 50 is a computer including a control unit 510, storage unit 520, and communication unit 530.

Control unit 510 includes a CPU, ROM, RAM, and a real-time clock. The CPU is configured to control each of the units of mobile communication terminals 10 described above by executing a program(s) stored in the ROM and/or storage unit 520 using the RAM as a work area The real-time clock displays current date and time. Storage unit 520 is a flash memory, hard drive or other storage device, in which data and program(s) used by control unit 510 for controlling mobile communication terminals 10b are stored. Additionally, predetermined parameters including threshold values used in mobile communication terminals 10b are stored in storage unit 520. Communication unit 530 includes a circuit to perform communication via network 2 to transmit and receive data to and from control unit 110. Control unit 110 transmits and receives data to and from base stations 20, AP 30 and mobile communication terminals 10b via communication unit 530.

Figure 23:
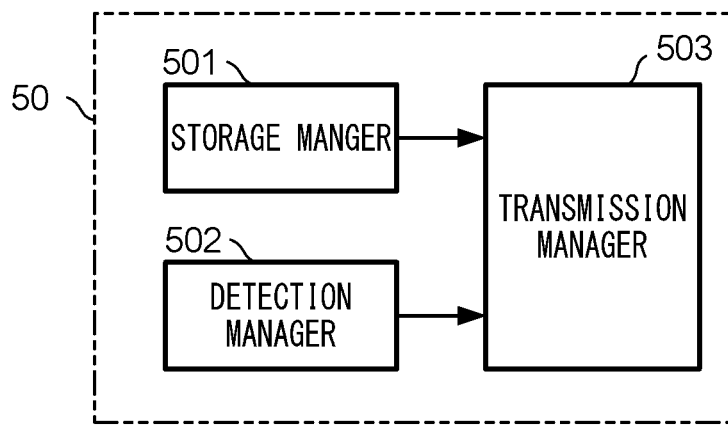
FIG. 23 shows a functionality implemented by the server apparatus.

In the hardware configuration described above, server apparatus 50 instructs mobile communication terminals 10b to start the search initiation process. A program for performing the instruction is stored in storage unit 520. Control unit 510 executes the program to implement the functionality of controlling the units shown in FIG. 22. FIG. 23 shows a functionality implemented at server apparatus 50. Server apparatus 50 includes a storage manager 501, search manager 502, and transmission manager 503. As described above, upon receipt of the detection-related data transmitted by mobile communication terminal 10b, storage manager 501 stores the length of time and other data items included in the detection-related data in association with each other. By this process, storage manager 501 collects from each of mobile communication terminals 10b, a length of time. The functionality of storage manager 501 is implemented by control unit 510, storage unit 520 and communication unit 530 cooperating with each other. Accumulated records of length of time by storage manager 501 is supplied to transmission manager 503.

Search manager 502 is configured to check whether the data transmitted by a mobile communication terminal 10b includes a start time, and if it is included, confirms that the mobile communication terminal 10b has started a search for a base station ID of a cell to which communication terminal 10b moved. By this process, search manager 502 determines that mobile communication terminal 10b has started a search for a base station ID. The functionality of search manager 502 is implemented by control unit 510, storage unit 520 and communication unit 530 in cooperation with each other. Upon detection of a start of a search, search manager 502 notifies transmission manager 503 of the start and outputs data indicative of a start time.

Transmission manager 503 is configured to transmit an instruction to start the search initiation process when search manager 502 determines that a mobile communication terminal 10b starts the search for a base station ID. The functionality of transmission manager 503 is implemented by control unit 510, storage unit 520, and communication unit 530, in cooperation with each other. More specifically, transmission manager 503 determines a waiting time based on a length of time stored by storage manager 501 associated with a base station ID detected by storage manager 501. The mobile communication terminal 10b is instructed to start the search initiation process when the waiting time has passed from the start time indicated by the data supplied by search manager 502.

Figure 24:
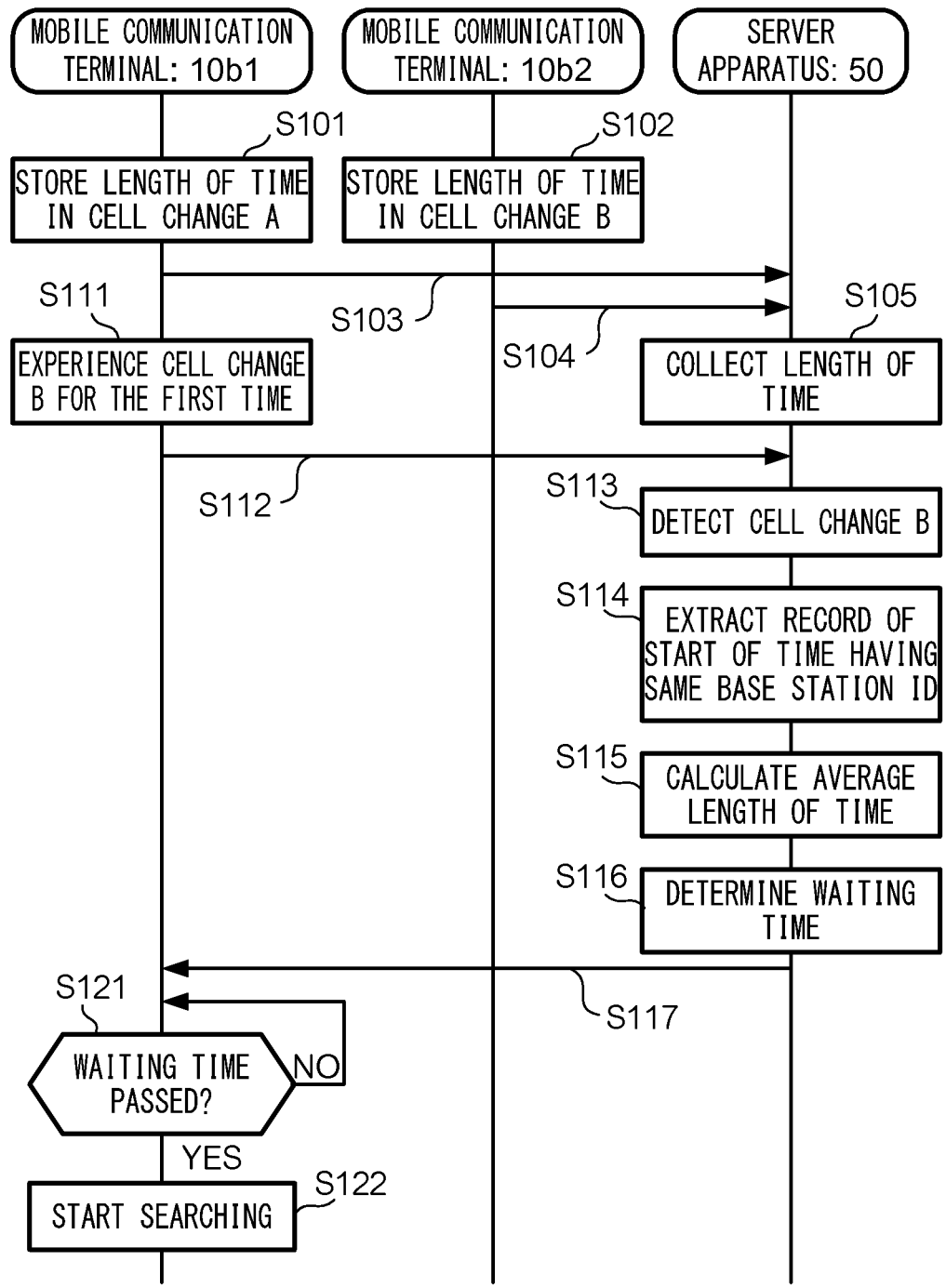
FIG. 24 is a sequence chart showing an example of a process of instructing an initiation of the search.

FIG. 24 is a sequence chart showing an example of operations performed by the nodes with regard to the instruction processes according to this embodiment. In FIG. 24, only mobile communication terminals 10b1 and 10b2 among other mobile communication terminals 10b are described mainly to explain an operation relating to the instruction process. Mobile communication terminals 10b1 and 10b2 perform the registration process shown in FIG. 7 (steps S101 and S102) and transmit the detection-related information to server apparatus 50 (steps S103 and S104). In this example, it is assumed that mobile communication terminal 10b1 experiences a cell change A (for example, a change from Roppongi 1 to Roppongi 2) and mobile communication terminal 10b2 experiences a cell change B (for example, a change from Yokohama 1 to Yokohama 2). Server apparatus 50 collects a length of time and other data items included in the detection-related information from each mobile communication terminal 10b (step S105). The process at step S105 is performed as shown in FIG. 23 storage manager 501.

It is assumed that mobile communication terminal 10b1 performs cell change B for the first time (step S111). After the start of cell change B, mobile communication terminal 10b1 transmits the start time to server apparatus 50 (step S112). Checking the received start time indicative of cell change B, server apparatus 50 confirms that mobile communication terminal 10b1 started cell change B (step S113). The process at step S113 is performed by search manager 502. Next, server apparatus 50 performs the processes of step S42, S43, and S44 shown in FIG. 8 (step S114, S115, and S116) to determine a waiting time. Next, server apparatus 50 transmits an instruction of starting the search initiation process when the waiting time has passed from the start time to mobile communication terminal 10b1 (step S117). The process at steps S114 though S117 are performed by transmission manager 503.

Upon receipt of the instruction transmitted in step S117, mobile communication terminal 10b1 determines whether the waiting time included in the instruction has passed from the start time (step S121). If the waiting time has not passed (step S121:NO), mobile communication terminal 10b1 repeats the process at step S121. If the waiting time has passed (step S121:YES), mobile communication terminal 10b1 starts the search (step S122). The processes of steps S121 and S122 are performed by controller 104 shown in FIG. 3.

In view of the above, with regard to management system 1b it is possible to start the search based on a length of time registered in connection with a movement made by other mobile communication terminals, if the mobile communication terminal makes the movement for the first time as shown in FIG. 24. Stated otherwise, in this embodiment it is possible automatically to start the search without an instruction input by the user to access AP30 in an area the user enters for the first time. In addition, the search is prohibited until the mobile communication terminal 10 comes close to an accessible range. Thus, power consumed by mobile communication terminal 10 will be reduced compared to a case where the search is continuously executed.

MODIFICATIONS

The embodiments described above are mere examples of applications of the present invention, and therefore can be modified as provided below. It is noted that the embodiments and the modified examples provided below can be combined.

Modification 1

With regard to management systems according to the embodiments described above, storage manager 103 shown in FIG. 3 detects that first communication manager 101 started a search for the second base station ID so as to determine the start time. The determination is hereinafter referred to as "the first determination method." Storage manager 103 may determine the start time to be a time when the strength of the first signal including the first base station ID received by first communication manager 101 becomes larger than the strength of a signal including the second base station ID received by first communication manager 101. The determination is hereinafter referred to as "the second determination method." Accordingly, in the case of FIG. 4, a time when the first and the second signals are received at position C14 is recorded as the start time. Alternatively, storage manager 103 may determine the start time to be a time when first communication manager 101 starts a search for a base station ID. The determination is hereinafter referred to as "the third determination method." Accordingly, in the case of FIG. 4, a time when the second signal is received at position C15 is recorded as the start time.

In the case where mobile communication terminal moves along path B1 shown in FIG. 4 when there is a change of cells from Roppongi 1 to Roppongi 2, a time when the second signal is received at a position near C13 will be registered as the start time according to the first determination method. According to the second determination method, the start time will be recorded as a time when the second signal is received at a position near C14. According to the third determination method, the start time will be recorded as a time when the second signal is received at a position near C15. To summarize, it is preferable that positions at which the second signal for determining the start time are almost the same in any determination method adopted by storage manager 103.

Modification 2

With regard to management systems according to the embodiments described above, the search process is initiated when a mobile communication terminal moves from one cell to an adjacent cell. The search process can also be initiated when the mobile communication terminal enters a cell. Description will be hereinafter directed to an application of the present modification to the system of the first embodiment. In this case, when second communication manager 102 accesses AP 30 after a search for the base station ID is initiated by first communication manager 101, storage manager 103 shown in FIG. 3 calculates a length of time from a start time to a connection time with regard to the search and stores the calculated length of time in association with the base station ID. When communication manager 101 starts a search for a base station ID included in base station IDs stored by storage manager 103, controller 104 starts the search initiation process when a waiting time determined based on the length of time associated with the base station ID stored by storage manager 103 has passed from a time when the search started.

Figures 25, 26A, 26B:
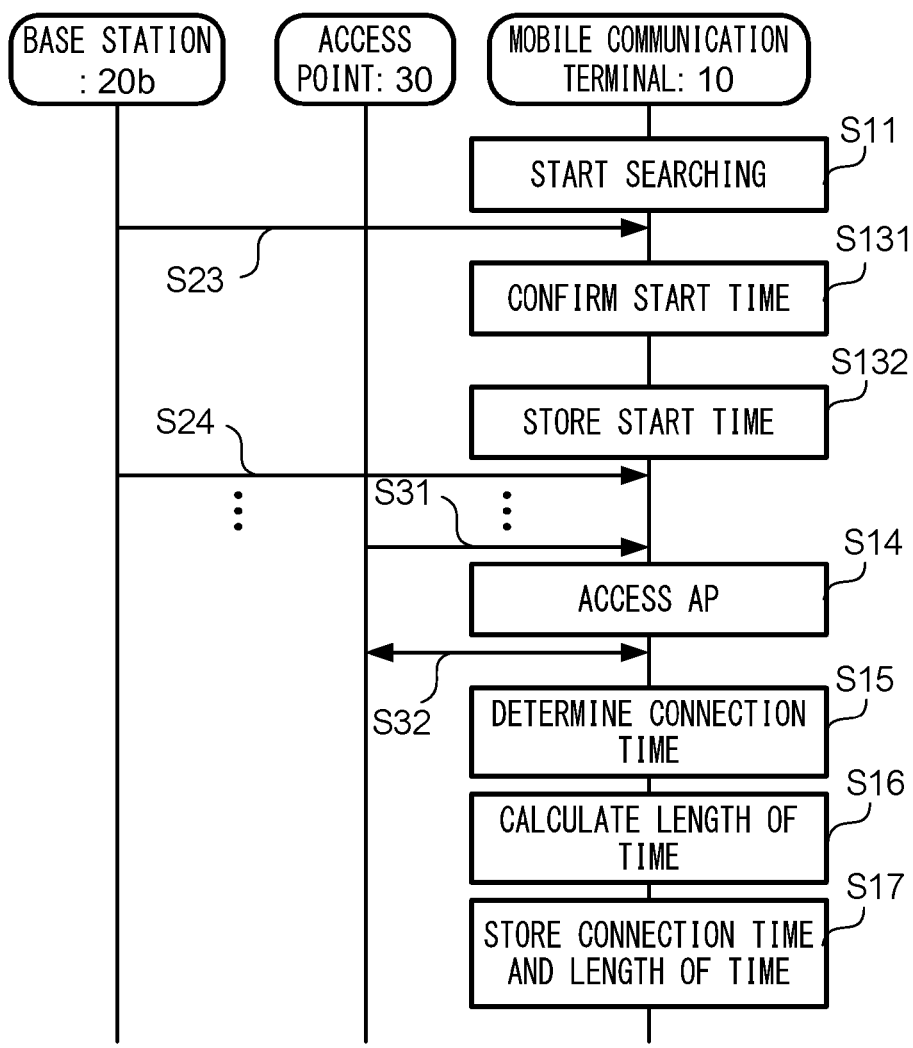
FIG. 25 is a sequence chart showing an example of registration of a length of time.

FIG. 25 is a sequence chart showing an example of operations performed by the nodes with regard to the registration process according to the present modification. In this example, it is assumed that mobile communication terminal 10 is entering a cell of base station 20b. Firstly, mobile communication terminal 10 performs the process at step S11 shown in FIG. 7 with regard to an initiation of search. Upon receipt of a signal in step S23, mobile communication terminal 10 determines the time of receipt of the signal to be the start time (step S131), and stores the start time in association with a base station ID included in the signal (step S132). Next, mobile communication terminal 10 performs a process similar to that shown in FIG. 7 up to step S15. In step S15, the length of time is calculated based on the connection time and the start time is stored in step S132 (step S133). The processes of steps S131, S132, and S133 are performed by storage manager 103.

FIG. 26 shows an example of data written in a table stored in connection with the registration process according to the present modification of the registration process. FIG. 26A shows an example of data written in the first DB. In the present modification, a record of the start time is associated with a single base station ID, whereas a record of the start time is associated with two base station IDs in the embodiments described above. FIG. 26B shows an example of data written in the second DB. In the present modification, records of the length of time and the connection time are associated with a single base station ID, whereas the records of the length of time and connection time are associated with two base station IDs in the embodiments described above.

Figure 27:
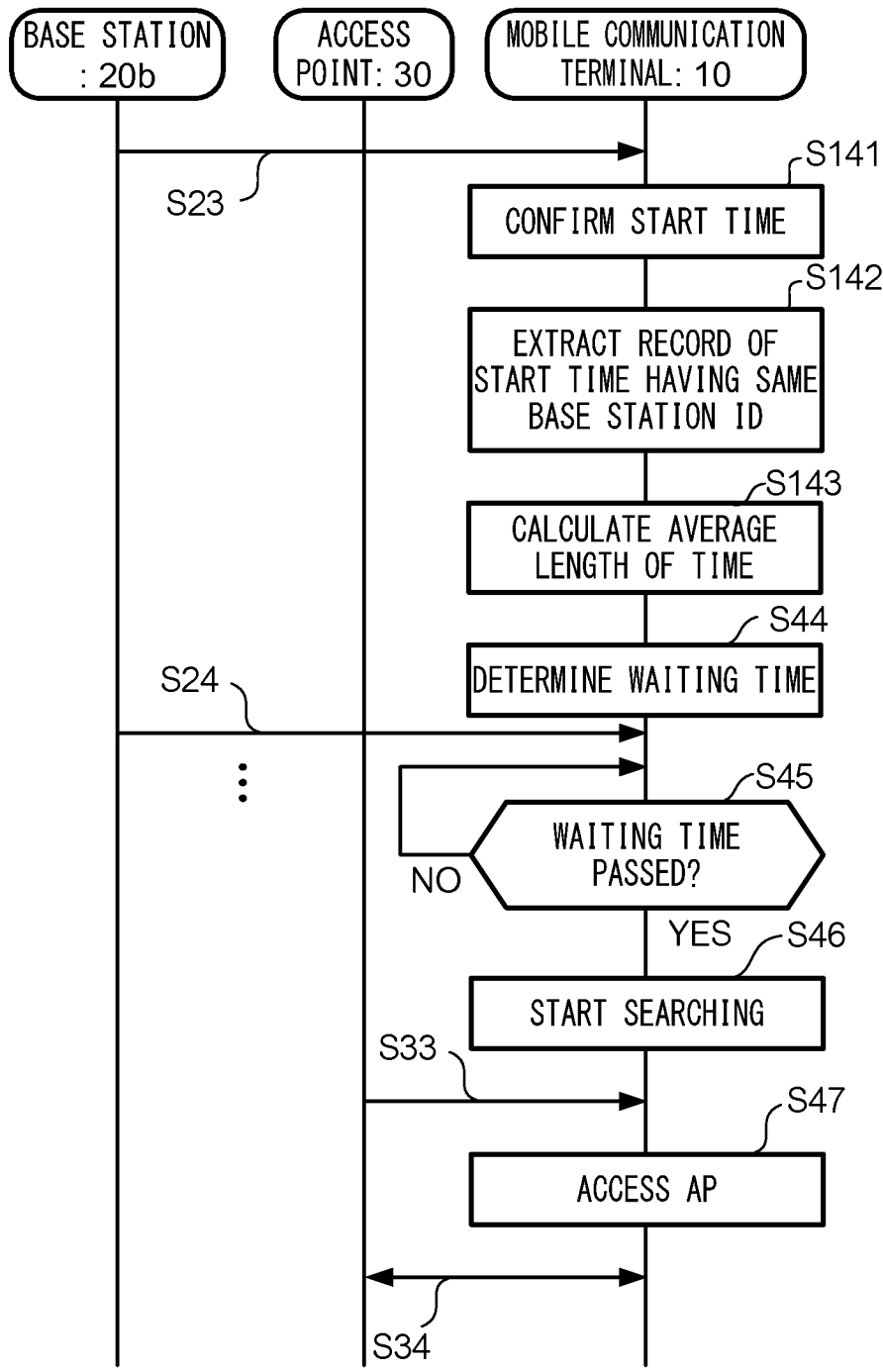
FIG. 27 is a sequence chart showing an example of an operation with regard to initiation of detection.

FIG. 27 is a sequence chart showing an example of operations performed by the nodes with regard to the search initiation process according to the present modification. Upon receipt of a signal included in a base station ID in step S23, mobile communication terminal 10 determines the time of receipt of the signal to be the start time (step S141). Next, mobile communication terminal 10 extracts a record of the start time associated with the base station ID included in the signal received in step S23 (step S142). Next, mobile communication terminal 10 extracts a record of the length of time calculated based on the record of the start time extracted in step S142 from records of lengths of time stored in connection with the registration process to calculate an average length of time (step S143). The processes of steps S141, S142, and S143 are performed by controller 104. Next, mobile communication terminal 10 performs the process at step S44 and the subsequent processes, similarly to that of the search initiation process shown in FIG. 8.

In daily life, a user tends to take a predetermined route(s) to get to work or school. Some users may take a different route for going to the office or school and going back home. It is herein assumed that a user takes a path entering cell A12 by F2 and going out of A12 by F8 among the other possible eleven routes shown in FIG. 9 to go the office and going back home without passing through cell A12. In this case the length of time calculated by a mobile communication terminal of the user will be substantially dependant on the time necessary for moving along path F2. Accordingly, the mobile communication terminal starts the search when nearing the accessible range of AP 30. As a result, compared to a case where the search initiation process according to the present modification is not performed, the length of time from an initiation of the search to a completion of an access will be shorter, and therefore consumption of power for the search will be smaller. For example, when a user goes to his/her office, the length of time in association with a time slot includes the start time, similarly to the fourth embodiment. On another day when the user goes to his/her office, the search will start based on the length of time stored for the same path for going to the office. As a result, consumption of power will be reduced.

Modification 3

With regard to management systems according to the embodiments described above, the waiting time is calculated by subtracting a predetermined length of time from an average length of time by controller 104 shown in FIG. 3. It is possible to employ other methods of determining the waiting time. For example, controller 104 may add the calculated average length of time to a predetermined length of time, or perform multiplication or division of the average length of time to determine the waiting time. Alternatively, controller 104 may determine the calculated average length of time to be the waiting time. Alternatively, controller 104 may calculate an average length of time by introducing a weight based on a date or time of a record such that a record of the length of time stored later weighs more. As a result, after a user changes a route which the user normally takes, the average length of time gradually comes closer to a time period from the actual start time to the connection time as the number of times a new path is taken increases. This means that the time at which the search starts becomes close to the time at which a user reaches the accessible range.

Alternatively, in the calculation of the average length of time controller 104 may exclude a record of the length of time indicating that a time length (hereinafter referred simply to as "a search period" from the start of a search to the start of an access to AP 30 is larger than a threshold. It is likely that the detection period will become larger than the threshold in a case where the behavior of a user is irregular, as in running instead of walking along a usual route or taking a different route. Although only a calculation of an average length of time which is described in the embodiment described above will reduce effects due to such an irregularity, the calculation according to the present modification will further reduce the effects.

Alternatively, controller 104 may extract a record of the length of time having the shortest search period to determine a waiting time based on the extracted length of time instead of the average length of time. In this case, once a length of time determined for regular behavior is used for determining the waiting time, the effects from irregular behavior are no longer reflected in the calculation. Accordingly, in the present modification a shorter time period during which a wireless LAN can be used or an increased consumption of power will be prevented because a length of time does not change due to a user's irregular behavior.

On the other hand, there is a possibility that a mistakenly long time period remains unchanged in a case that the behavior of a user is irregular when a registration is performed for a change of cells for the first time. In this case, even if the user exhibits repeatedly regular behavior after the registration, the length of time does not effect the waiting time. As a result, the start time of the search may be set too early or too late. In this regard, controller 104 may accumulate records of the lengths of time for traversing a path taken by a user by up to a predetermined number of times to determine a waiting time, and determine the waiting time according to the present modification without updating the waiting time when the user takes the path for more than the predestined number of times. In this case, the user does not need to care about a walking speed or time with regard to his/her movement.

Modification 4

A connection management system according to the embodiments includes a single AP 30. Alternatively, connection management system according to the present invention may include two or more APs 30. In this case, with regard to the registration process shown in FIG. 7, the calculation of a connection time and length of time (steps S15 and S16) are performed every time a mobile communication terminal accesses each of APs 30 (step S14). Next, the mobile communication terminal stores the connection time and length of time for each AP 30 (step S17). With regard to the search initiation process shown in FIG. 8, mobile communication terminal searches for a record of the start time for each AP 30 (step S42) and calculates an average length of time (step S43) and waiting time (step S44) for each AP 30.

Next, mobile communication terminal performs the processes of steps S45, S46, and S47 firstly for an AP 30 for which the shortest waiting time is stored. After that, when a waiting time for another AP 30 has passed from the start time (step S45:YES), the mobile communication terminal additionally starts the search (step S46). In a case where a waiting time for another AP 30 has passed from the start time and a wireless LAN communication (step S34) with another AP 30 accessed earlier is continuing, the mobile communication terminal may omit a search for AP 30, whose waiting time has passed.

Modification 5

The present invention provides methods of performing a process regarding a search and a process with regard to an instruction executed by the server apparatus in addition to a mobile communication terminal, server apparatus, and connection management system. The process regarding the search includes the registration process shown in FIG. 7 or the like, the search initiation process shown in FIG. 8 or the like, and the search initiation/termination process shown in FIG. 10 or the like. The process with regard to the instruction is performed by server apparatus 50 shown in FIG. 24. The present invention also provides programs that cause a computer, which includes mobile communication terminal and server apparatus or the like, to execute a search process for the intrusion process. The program can be stored on an optical disk or other storage medium for distribution to users. Alternatively, the program can be downloaded to a computer and installed by users to implement the program's functionality.

What is claimed is:

1. A mobile communication terminal, comprising:
   a processor having a memory, the processor for performing:
   wireless communication with a base station accommodated in a first communication network by receiving an identifier of the base station which identifier is transmitted intermittently by the base station;
   wireless communication to access an access point accommodated in a second communication network by detecting information transmitted by the access point, the access point covering a range smaller than a range of the base station;
   a calculation, when access to the access point is performed after a detection of the identifier, of a length of time from the detection of the identifier to start of the access, and stores the calculated length of time in association with the detected identifier; and
   searching for the access information when a reference time determined based on a length of time associated with the identifier has passed a time when the identifier is detected, in a case that the identifier detected by the first communication unit is stored.

2. The mobile communication terminal according to claim 1, wherein:
   in a case that the mobile communication terminal accesses the access point after detection of first and second identifiers, the first identifier being detected before the second identifier, a length of time from a time when the second identifier is detected is calculated and the calculated length of time is registered in association with the first and second identifiers; and
   if the second identifier associated with the first identifier is detected after the registration of the first identifier, the processor starts searching for access information when a reference time determined based on the length of time associated with the second identifier has passed from a time when the second identifier is detected.

3. The mobile communication terminal according to claim 1, wherein if a detected identifier is stored, the processor terminates the search for the access information when a predetermined time after the reference time has passed.

4. The mobile communication terminal according to claim 3, wherein:
   if the detected identifier is a predetermined identifier, the processor does not terminate the search.

5. The mobile communication terminal according to claim 1, wherein the processor further:
   stores the calculated length of time in addition to the identifier, in association with a time slot corresponding to a time when the identifier is detected; and
   if the detected identifier is stored, the processor starts searching for the access information when a reference time is determined based on a length of time associated with the detected identifier and a time slot in which the searching started to have passed a time when the searching started.

6. The mobile communication terminal according to claim 1, wherein the processor further:
   stores size information indicative of a size of an accessible range for wireless communication performed by the base station; and
   if the identifier stored is detected, the processor starts searching for the access information when a reference time determined based on a length of time associated with the identifier and the size information has passed from a time when the searching started.

7. A server comprising:
a processor having a memory, the processor for performing:
in a case where after a mobile communication terminal detects an identifier of a base station accommodated in a first communication network, the identifier being intermittently transmitted by the base station, the mobile communication terminal accesses an access point accommodated in a second communication network, the access point having an accessible range smaller than an accessible range of the base station, a calculation of a length of time starting at the detection of the identifier of the base station and ending at a completion of the access to the access point from the mobile communication terminal,
determining that the identifier is detected in the mobile communication terminal; and
transmitting an instruction of starting a search for access information of the access point to the mobile communication terminal when the length of time which is collected by the processor and associated with the identifier has passed from a time at which the identifier is detected.

8. A communication management system, comprising:
a server apparatus and a plurality of mobile communication terminals,
each mobile communication terminal comprises:
a processor for performing:
wireless communication with a base station accommodated in a first communication network by receiving an identifier of the base station which is transmitted intermittently by the base station;
wireless communication to access an access point accommodated in second communication network by detecting information transmitted by the access point, the access point covering a range smaller than the range of the base station;
a calculation, when an access to the access point is performed after a detection of the identifier, of a length of time from the detection of the identifier to an initiation of the access, and stores the calculated length of time in association with the detected identifier; and
searching for the access information when a reference time determined based on a length of time associated with the identifier has passed from a time when the identifier is detected, in a case that the identifier detected is stored, the server apparatus comprises:
a processor for:
accumulating lengths of time from the mobile communication terminals;
determining that the identifier is detected in a mobile communication terminal; and
transmitting an instruction for starting a search for access information of the access point to the mobile communication terminal when a length of time accumulated in the processor and associated with the identifier has passed a time when the identifier is detected.

9. A communication management method, comprising:
registering a length of time starting at a time when an identifier of a base station is detected by a first communication unit, the identifier being transmitted by the base station accommodated in a first communication network, and ending at a time when the first communication unit accesses an access point accommodated in a second communication network in association with the identifier, the access point having an accessible range smaller than that of an accessible range of the base station; and
starting a search for access information transmitted by the access point, by the first communication unit, when a reference time determined based on a length of time associated with the registered identifier has passed from a time when the identifier is detected, in a case that the identifier detected by the first communication unit is stored.

10. A non-transitory computer readable medium storing a program that causes a computer to execute:
registering a length of time starting at a time when an identifier of a base station is detected, the identifier transmitted by the base station being accommodated in a first communication network, and ending at a time when an access point accommodated in a second communication network in association with the identifier is accessed, the access point having an accessible range smaller than that of an accessible range of the base station; and
starting a search for access information transmitted by the access point, when a reference time determined based on a length of time associated with the registered identifier has passed from a time when the identifier is detected, in a case where the detected identifier is stored.

* * * * *